(12) United States Patent
Neerbek et al.

(10) Patent No.: US 11,395,232 B2
(45) Date of Patent: Jul. 19, 2022

(54) PROVIDING SAFETY AND ENVIRONMENTAL FEATURES USING HUMAN PRESENCE DETECTION

(71) Applicant: Roku, Inc., San Jose, CA (US)

(72) Inventors: Jan Neerbek, Beder (DK); Rafal Krzysztof Malewski, Aalborg (DK); Brian Thoft Moth Møller, Hojberg (DK); Paul Nangeroni, San Francisco, CA (US); Amalavoyal Narasimha Chari, Palo Alto, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 15/930,706

(22) Filed: May 13, 2020

(65) Prior Publication Data
US 2021/0360533 A1    Nov. 18, 2021

(51) Int. Cl.
*G08B 19/00*    (2006.01)
*H04W 52/02*    (2009.01)
(Continued)

(52) U.S. Cl.
CPC .... *H04W 52/0254* (2013.01); *G06K 9/00335* (2013.01); *G06K 9/6289* (2013.01);
(Continued)

(58) Field of Classification Search
CPC .......... H04W 52/0254; G06K 9/00335; G06K 9/6289; G08B 13/24; G08B 29/188; H04N 5/57; H04Q 9/00; H04Q 2213/002; G16Y 40/50; G16Y 10/65; G16Y 20/40; G06V 40/20
See application file for complete search history.

(56) References Cited

U.S. PATENT DOCUMENTS 8,098,155 B2 *   1/2012   Gloo .................... G01S 5/04
                                                   340/539.21
9,288,597 B2     3/2016   Carlsson et al.
                (Continued)

FOREIGN PATENT DOCUMENTS

KR      100994151 B1   11/2010
KR      102039857 B1   11/2019

OTHER PUBLICATIONS

Mrazovac et al., System and Method for Passive Surveillance in Indoor Environments Based on Principal Components for the Signal Strength Variation (Year: 2012).*

(Continued)

*Primary Examiner* — Quang Pham
(74) *Attorney, Agent, or Firm* — Sterne, Kessler, Goldstein & Fox P.L.L.C.

(57) ABSTRACT

Disclosed herein are system, method, and computer program product embodiments for the detection of human presence in front of a plurality of sensors such as those of speakers and a device with a processor, such as a television. Data gathered from the plurality of sensors may be analyzed by the processor to determine if one or more humans are present proximate to the device. Based on the determined presence or absence of one or more humans, further actions including, inter alia, activating a sleep mode for the one or more humans, shutting off the device in a green mode, or alerting an owner-user to the presence of an intruder can be taken.

20 Claims, 14 Drawing Sheets

(51) Int. Cl.
| | |
|---|---|
| *G06K 9/62* | (2022.01) |
| *G08B 29/18* | (2006.01) |
| *H04Q 9/00* | (2006.01) |
| *H04N 5/57* | (2006.01) |
| *G08B 13/24* | (2006.01) |
| *G06K 9/00* | (2022.01) |
| *G16Y 40/50* | (2020.01) |
| *G16Y 10/65* | (2020.01) |
| *G16Y 20/40* | (2020.01) |

(52) U.S. Cl.
CPC ......... *G08B 13/24* (2013.01); *G08B 29/188* (2013.01); *H04N 5/57* (2013.01); *H04Q 9/00* (2013.01); *G16Y 10/65* (2020.01); *G16Y 20/40* (2020.01); *G16Y 40/50* (2020.01); *H04Q 2213/002* (2013.01)

(56) References Cited

U.S. PATENT DOCUMENTS

| | | | |
|---|---|---|---|
| 9,363,629 B2* | 6/2016 | Kim | G01S 5/0252 |
| 9,665,169 B1* | 5/2017 | Dai | A61B 5/6898 |
| 10,117,214 B1* | 10/2018 | Peden | H04L 67/24 |
| 10,200,753 B1* | 2/2019 | Hao | H04L 65/1016 |
| 10,205,988 B1* | 2/2019 | Waterman | H04N 21/8455 |
| 10,298,281 B2* | 5/2019 | Neumann | H04B 1/385 |
| 10,305,766 B1* | 5/2019 | Zhang | G08B 21/0484 |
| 10,401,807 B2* | 9/2019 | Jo | G08C 17/02 |
| 10,425,780 B1* | 9/2019 | Devaraj | G10L 15/22 |
| 10,878,956 B2* | 12/2020 | Bullington | G16H 40/20 |
| 11,030,902 B2* | 6/2021 | Bakhishev | G06N 20/00 |
| 11,202,121 B2 | 12/2021 | Neerbek et al. | |
| 11,212,649 B2* | 12/2021 | Ivanov | G01S 5/0252 |
| 2004/0155773 A1* | 8/2004 | Russell | G08B 21/0202 340/573.3 |
| 2005/0055568 A1* | 3/2005 | Agrawala | G08B 13/2491 726/2 |
| 2007/0030161 A1* | 2/2007 | Yang | F24C 7/08 340/679 |
| 2008/0007404 A1* | 1/2008 | Albert | G08B 13/2497 340/552 |
| 2009/0232481 A1* | 9/2009 | Baalbergen | H04N 21/8455 386/328 |
| 2010/0222010 A1* | 9/2010 | Ozaki | H04B 5/0081 455/150.1 |
| 2010/0241600 A1* | 9/2010 | Krichevskiy | G06N 3/08 718/1 |
| 2011/0063110 A1* | 3/2011 | Habib | G08B 13/2491 340/552 |
| 2011/0080529 A1* | 4/2011 | Wong | H04N 21/44218 345/158 |
| 2011/0115766 A1* | 5/2011 | Kerofsky | H04N 5/44 345/212 |
| 2012/0050015 A1* | 3/2012 | Low | H02J 7/025 235/492 |
| 2012/0092171 A1* | 4/2012 | Hwang | G16H 50/20 340/575 |
| 2012/0112877 A1* | 5/2012 | Gravino | G06F 1/3231 340/4.31 |
| 2012/0146788 A1* | 6/2012 | Wilson | G08B 13/187 340/539.23 |
| 2012/0188057 A1* | 7/2012 | Green | H04L 67/12 340/8.1 |
| 2012/0190398 A1* | 7/2012 | Leukkunen | H04B 7/0691 455/522 |
| 2013/0207808 A1* | 8/2013 | Lehmann | G08B 21/02 340/600 |
| 2013/0300358 A1* | 11/2013 | Kirby | H04B 5/0037 320/108 |
| 2014/0051408 A1* | 2/2014 | Jenzowsky | H04N 21/41265 455/414.1 |
| 2014/0179259 A1* | 6/2014 | Liu | H04W 4/029 455/457 |
| 2014/0218520 A1* | 8/2014 | Teich | H04N 5/332 348/165 |
| 2014/0229184 A1* | 8/2014 | Shires | H04L 12/282 704/275 |
| 2014/0240122 A1* | 8/2014 | Roberts | G08B 6/00 340/539.11 |
| 2014/0267002 A1* | 9/2014 | Luna | H04W 76/14 345/156 |
| 2014/0310744 A1* | 10/2014 | Gelonese | G06F 1/266 725/133 |
| 2015/0024769 A1* | 1/2015 | Chen | H04W 48/20 455/452.2 |
| 2015/0171977 A1* | 6/2015 | Kashiwagi | H01Q 3/02 342/351 |
| 2015/0193198 A1* | 7/2015 | Hutchings | H04W 4/70 700/94 |
| 2015/0251074 A1* | 9/2015 | Ahmed | A61B 5/7278 700/91 |
| 2015/0258301 A1* | 9/2015 | Trivedi | A61B 5/0024 600/28 |
| 2016/0050245 A1* | 2/2016 | Huang | H04L 65/4084 709/219 |
| 2016/0050639 A1* | 2/2016 | Ostergaard | H04W 4/02 455/456.1 |
| 2016/0099604 A1* | 4/2016 | Von Novak, III | H02J 7/025 320/108 |
| 2016/0105807 A1* | 4/2016 | Yadav | H04W 4/33 455/456.1 |
| 2016/0151603 A1* | 6/2016 | Shouldice | A61M 21/02 600/26 |
| 2016/0154392 A1* | 6/2016 | Jo | G05B 15/02 700/12 |
| 2016/0295524 A1* | 10/2016 | Harris, III | H04L 43/16 |
| 2016/0335671 A1* | 11/2016 | Pitschel | H04L 65/1089 |
| 2016/0381144 A1* | 12/2016 | Malik | H04L 67/125 455/517 |
| 2017/0078845 A1* | 3/2017 | Wootton | G11C 11/2293 |
| 2017/0185143 A1* | 6/2017 | Zhou | G06F 3/0346 |
| 2017/0222491 A1* | 8/2017 | Von Novak, III | H02J 50/70 |
| 2017/0224254 A1* | 8/2017 | Chuang | A61B 5/4866 |
| 2017/0249122 A1* | 8/2017 | Pance | G06F 3/165 |
| 2017/0358951 A1* | 12/2017 | Wheeland | H02J 7/0042 |
| 2017/0372836 A1* | 12/2017 | Jeong | H02J 7/045 |
| 2018/0007431 A1* | 1/2018 | Sidhu | H04N 21/25883 |
| 2018/0144645 A1* | 5/2018 | Fenton | G05D 1/0676 |
| 2018/0146430 A1* | 5/2018 | Yadav | H04W 52/0241 |
| 2018/0192144 A1* | 7/2018 | McElroy | H04N 21/8455 |
| 2018/0233145 A1* | 8/2018 | Bathiche | G10L 25/51 |
| 2018/0301937 A1* | 10/2018 | Park | H02J 50/60 |
| 2018/0365942 A1* | 12/2018 | Molloy | H04W 4/90 |
| 2019/0035244 A1* | 1/2019 | Garg | G08B 13/2491 |
| 2019/0075358 A1* | 3/2019 | Glazier | H04N 21/43615 |
| 2019/0086991 A1* | 3/2019 | Lee | H04N 21/4436 |
| 2019/0104282 A1 | 4/2019 | Siu et al. | |
| 2019/0197863 A1* | 6/2019 | Kao | G08B 21/0272 |
| 2019/0215562 A1* | 7/2019 | Scavo | H04N 21/44218 |
| 2020/0005364 A1* | 1/2020 | Aznaurashvili | G10L 15/26 |
| 2020/0029345 A1* | 1/2020 | Malik | H04B 17/21 |
| 2020/0320550 A1* | 10/2020 | Reichert | H04W 4/33 |
| 2021/0014308 A1* | 1/2021 | Larsson | H04W 4/02 |
| 2021/0021962 A1* | 1/2021 | Diaz Fuente | H04W 84/18 |
| 2021/0360317 A1* | 11/2021 | Neerbek | H04N 21/814 |
| 2021/0360318 A1* | 11/2021 | Neerbek | H04N 21/814 |

OTHER PUBLICATIONS

Kosba et al., Analysis of a Device-Free Passive Tracking System in Typical Wireless Environments (Year: 2009).*
Mrazovac et al., System and method for passive surveillance in indoor environments based on principal components of the signal strength variation (Year: 2012).*
Mrazovac et al., System Design for Passive Human Detection Using Principal Components of the Signal Strength Space (Year: 2012).*
Sampath et al., Sensor network based device free trespasser detection and localisation (Year: 2014).*
Sanchez et al., Building Your Own Infrastructure Based 802.11 Fingerprinting Service (Year: 2014).*

(56) References Cited

OTHER PUBLICATIONS

Zhan et al., Efficient Localization of Multiple Intruders in Shared Spectrum System (Year: 2020).*
Booranawong et al., A System for Detection and Tracking of Human Movements Using RSSI Signals (Year: 2018).*
George et al., A combined inductive-capacitive proximity sensor and its application to seat occupancy sensing (Year: 2019).*
Mrazovac et al., A human detection method for residential smart energy systems based on Zigbee RSSI changes (Year: 2012).*
Zambotti et al., Wearable Sleep Technology in Clinical and Research Settings (Year: 2019).*
Mehrali et al., Blending Electronics with the Human Body A Pathway toward a Cybernetic Future (Year: 2018).*
Korolkov et al., Received-Signal-Strength-Based Approach for Detection and 2D Indoor Localization of Evil Twin Rogue Access Point in 802.11 (Year: 2021).*
Chuku et al., RSSI-Based Localization Schemes for Wireless Sensor Networks Using Outlier Detection (Year: 2021).*
Khalili et al., Wi-Fi Sensing: Applications and Challenges (Year: 2019).*
Deak et al., Wireless Sensor Networks -Smoothing algorithms for RSSI-based Device-free Passive Localisation (Year: 2010).*
U.S. Appl. No. 15/930,704, filed May 13, 2020, entitled "Providing Customized Entertainment Experience Using Human Presence Detection".
U.S. Appl. No. 15/930,712, filed May 13, 2020, entitled "Providing Energy-Efficient Features Using Human Presence Detection".
International Search Report and Written Opinion of the International Searching Authority directed to related International Patent Application No. PCT/US2021/032301, dated Aug. 26, 2021; 7 pages.
International Search Report and Written Opinion of the International Searching Authority directed to related International Patent Application No. PCT/US2021/032302, dated Aug. 26, 2021; 7 pages.

* cited by examiner

GUI 700a
FIG. 7A — Are you present in the living room? 703a
Yes 705a   No 707a
GUI 700b
FIG. 7B — 703b Intruder has been detected!
Sound Alarm 705b   Ignore 707b
 Remember My Choice 709b

PROVIDING SAFETY AND ENVIRONMENTAL FEATURES USING HUMAN PRESENCE DETECTION

BACKGROUND

In the present day and age, consumers of entertainment often utilize television-speaker setups. In particular, to achieve a surround-sound effect, users often arrange a viewing space with speakers, which may be connected to a central television (TV) at the front of said viewing space. In this manner, by having sound emanate from various points around them, consumers are able to enjoy entertainment with realistic sound effects.

However, their experience with such a viewing experience may still be limited in several ways. Because it is not known whether humans are present or not in front of the TV, the setup cannot often be used for further customizations with regard to human presence. For example, the speakers are not rearranged to match the location where any humans are present for optimal sound, lighting is often not arranged to reflect the location of the user, etc. In this manner, the user does not receive a tailor-made experience that may reflect their position, or their personal liking.

Further, without knowing if a human is present or not in front of the television, additional information such as the number of such humans, or how they would respond to content playing on the screen, cannot be determined. Further, safety and energy features based on such presence detection can also not be used. Energy is often wasted when a user turns on a TV and may have to leave the front of the TV for a substantial period of time, and other peripheral battery-powered devices such as a device remote for controlling the television are also left on operating at full-power. Often, perhaps because of an emergency, or due to any other reason where the user is not able to turn the TV off before they walk away, a significant amount of energy is wasted in this manner. In this case, until the user physically returns to within proximate range of the TV, or uses the remote of such a TV, the TV is not turned off. In this case, even though the television is not being watched by the user, energy is being wasted.

Furthermore, energy waste may occur regardless of whether the user is present or not when a device, such as a WiFi remote for controlling the television, is operating at a full power mode all the time.

BRIEF DESCRIPTION OF THE DRAWINGS

The accompanying drawings are incorporated herein and form a part of the specification.

FIG. 7A is an exemplary graphical user interface (GUI) displayed, seeking user input through the GUI to determine if the user is present proximate to the sensors/devices of a reference setup, according to some embodiments.

FIG. 7B is an exemplary GUI informing a user that an intruder has been detected, and seeking input from the user on what action to perform with respect to the intruder, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for efficient human-presence detection or monitoring by Wi-Fi radiation using transmitters and receiversas part of a smart, Internet-of-Things (IOT) system, including in speaker-based or television-speaker-based setups. By having multiple speakers or sensors placed strategically surrounding a user, the embodiments provided herein can accurately detect whether or not a user is in front of and proximate to the TV with a great degree of accuracy due to multiple signals being sent and is versatile for use in a variety of locations. Further, based on such detection, and embodiments where such speakers are smart speakers and can interact with a smart television, a variety of user-tailored experiences can be provided such as home automation, detection of a user coming home, environmental features such as a green mode or a sleep mode, and the detection of an intruder.

Figure 1:
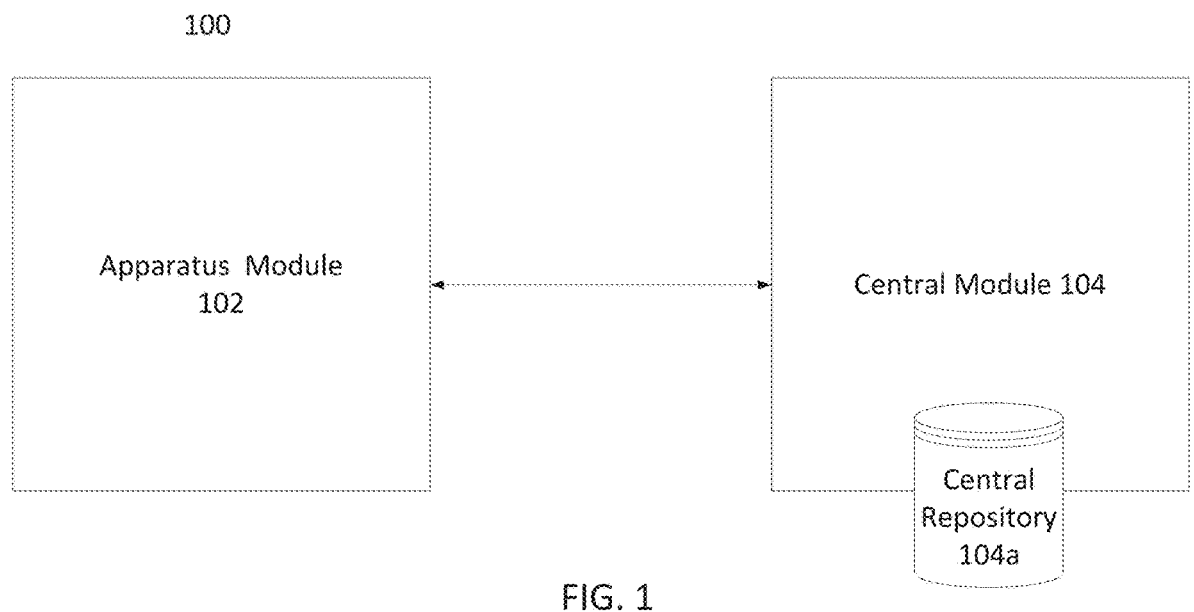
FIG. 1 is a block diagram of the interaction between an apparatus module and a central module, according to some embodiments.

FIG. 1 is a block diagram of a data-transfer environment 100 showing the interaction between an apparatus module 102, with a central television (TV) module (central module) 104, which may include a central module repository 104a. The embodiments described herein are directed to apparatus modules including a plurality of speakers and other devices such as smartphones, WiFi remotes, soundbars, etc. and a television, in a television surround sound set-up, where these devices collectively may form a smart, Internet-of-Things system. In this sense, each of the devices has sensors attached to it and can transmit data wirelessly to each other, or to a television, which in this case is the central module 104. Through the described embodiments, smart speakers may be able, through WiFi transmissions and receptions from each speaker, in combination with data from sensors in a user-based cell phone, user-based remote input, etc., to transmit data to the central module for processing, and determine whether one or more humans are present in front of a TV. Alternately, each of the devices may submit data to the central module 104, which may be sent as part of a cloud-based network to a backend for further processing, or if each of the devices is connected to the internet, may be submitted from the device to the cloud-based network directly, wherein a result may then be submitted back to the central module 104. The outcome may drive events and customizations undertaken by the central module 104, utilizing apparatus modules 102.

Figure 12:
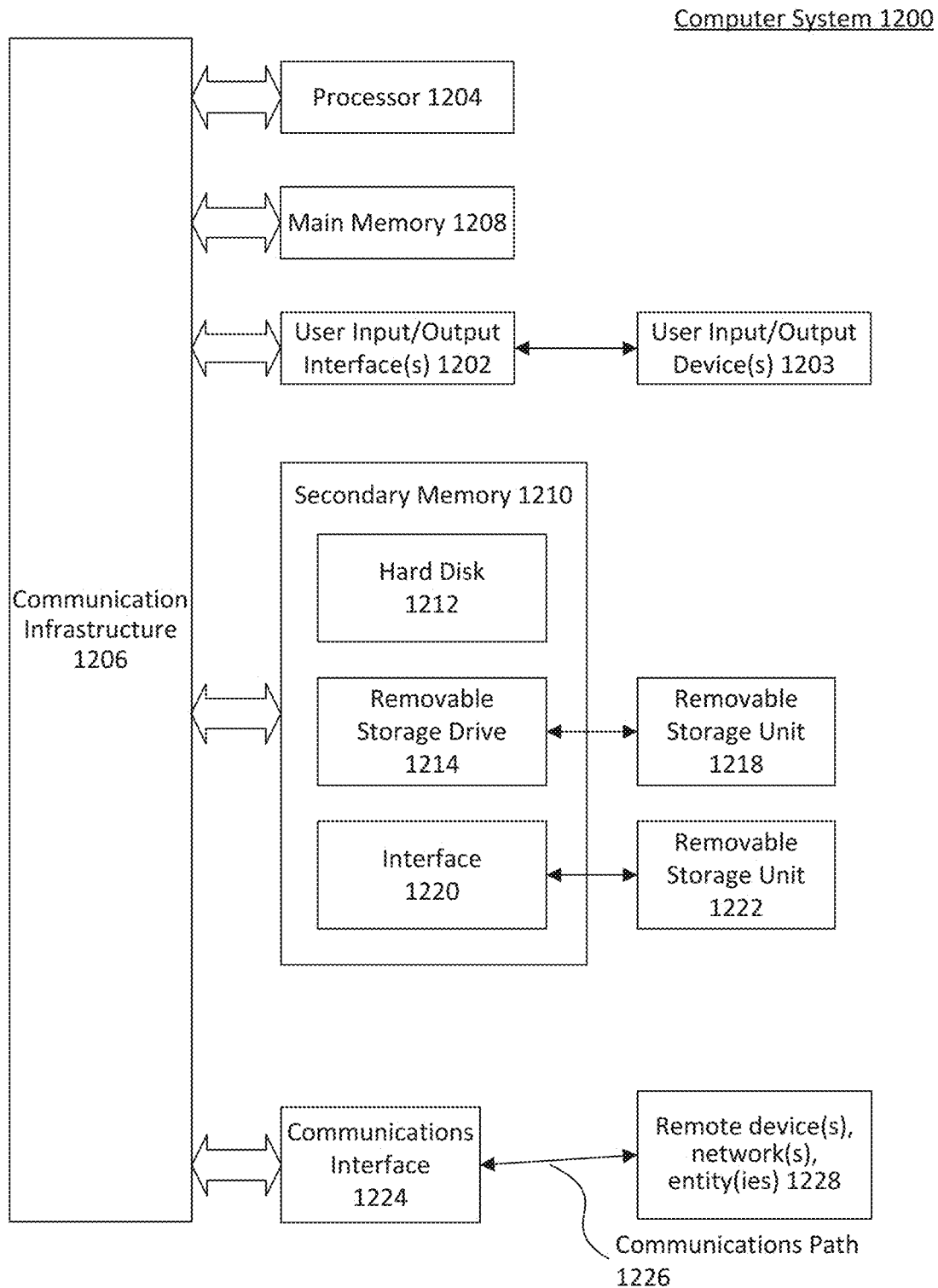
FIG. 12 is an example computer system useful for implementing various embodiments.

According to an embodiment, the central module 104 and the apparatus module 102 may comprise one or more separate computer systems such as the computer system 1200, as shown in FIG. 12 and will be explained later.

Figure 2:
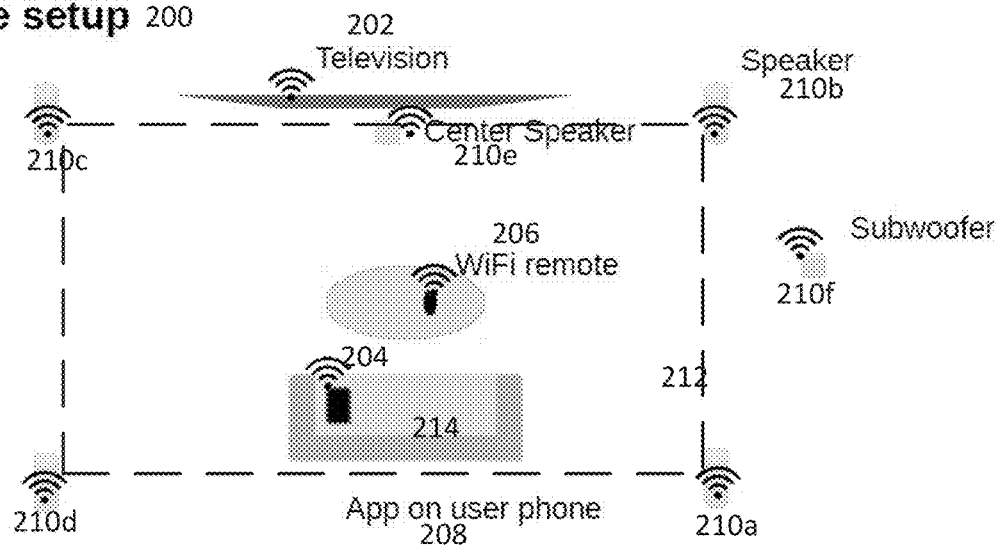
FIG. 2 is a reference setup of a plurality of interactive sensors/devices forming a zone around a potential user space, in front of a television, according to some embodiments.

To aid in describing the methods which are explained in FIGS. 2-10 that follow, an example embodiment of the underlying structure will first be described. The underlying structure of a computer system 1200, shown in FIG. 12, can be implemented by a smart television 202 as shown in FIG. 2. Such a computer system, may, according to the embodiments describe above, include apparatus modules 102 as sensor-based subcomponents, central module 104, and central module repository 104a. Computer system 1200 may include one or more processors (also called central processing units, or CPUs), such as a processor 1204, which may be a processor built-in the television (e.g. 202 in FIG. 2). Processor 1204 may be connected to a communication infrastructure or bus 1206.

Computer system 1200 may be virtualized, such as a virtual machine on a local server, or as part of a cloud-based network as described above. On the other hand, instead of being virtualized, in an alternative embodiment it may also include user input/output devices 1203, such as a WiFi remote 206, an application on a user smartphone 204, the screen of the television 202 as an output display device, etc., which may communicate with communication infrastructure 1206 through user input/output interface(s) 1202.

One or more processors 1204 may be a graphics processing unit (GPU). In an embodiment, a GPU may be a processor that is a specialized electronic circuit designed to process the multitude of data received from numerous speakers 210a-210f, device remote 206, and a user phone 204 in the reference setup 200 shown in FIG. 2. This data may be processed by the GPU utilizing a threshold-based, logistic regression, or machine-learning model to determine whether or not one or more humans are in front of the TV. Further, once such a determination is made, such a GPU may also be used for multiple user-based customizations. Such customizations may include controlling the position and output of speakers 210a-210f for optimal sound relative to a user location, performing an ambient sunrise on the screen of a TV (see 402a in the presence detection setup 400 of FIG. 4), controlling the position, output, and hue of lights 412a and 412b, displaying graphic user interfaces (GUI)'s on the television screen of TV 202 or on the app of a user phone 208 as shown in FIG. 7, entering a full-power or low-power mode on battery powered devices such as the device remote 206 if the user is asleep or not, or processing continuously monitored device and sensor data for detecting the presence of a possible intruder.

The GPU may have a parallel structure that is efficient for parallel processing of large blocks of data, such as data received from speakers, the device remote, or from an application on a user's phone, or conversely, for displaying graphics on the television screen of the smart television 202 or controlling sound or light output, etc. Mathematically intensive data is common to such computer graphics applications, images, videos, and audio output any of which can include table data received and stored in central module repository 104a.

A smart television implementing the computer system 1200 can also include a memory for use in connection with the execution of application programming, for receiving input from the devices such as wireless speakers 210a-210f, WiFi remote 206 or user phone 204, of FIG. 2, and for the temporary or long term storage of program instructions and/or data. As examples, main or primary memory 1208 of the TV can include , such as random access memory (RAM), dynamic random access memory (DRAM), synchronous dynamic access memory (SDRAM), or other solid state memory. Main memory 1208 can include one or more levels of cache (including secondary cache), which may be used in applications which control speaker output, light output, or output graphics on the display screen of a smart television such as 202 of FIG. 2, as well as for providing energy efficient features and modes of operation.

Computer system 1200 can also include one or more secondary storage devices or memory 1210. Secondary memory 1210 may include, for example, an external hard disk drive 1212 and/or a removable storage device or drive 1214 which can be plugged into the TV, which may interact with a Raid array 1216, which may combine multiple physical hard disk drive components (such as SSD or SATA-based disk drives) into one or more logical units, or a removable storage unit 1218. Removable storage unit 1218 may include a computer usable or readable storage device having stored thereon computer software (control logic) and/or data, including remotely accessed network drives. Removable storage unit 1218 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 1214 may read from and/or write to removable storage unit 1218. Alternatively, or in addition, secondary memory 1210 may also be non-removable and built into the TV, and comprise a solid state memory device or other devices.

A TV implementing computer system 1200 may further include a communication or network interface 1224. Communication interface 1224 may enable the TV implementing computer system 1200 to communicate and interact with any combination of external devices, external networks, external entities, etc. (individually and collectively referenced by reference number 1228). In particular the communication interface 1224 of such a TV may contain a wireless network interface controller for transmitting and receiving data using a variety of protocols such as Wi-Fi, Bluetooth, etc. In this manner, communication interface 1224 may allow the TV implementing computer system 1200 to communicate with external or remote entities 1228 over communications path 1226, which may be wired and/or wireless (or a combination thereof), and which may include any combination of LANs, WANs, the Internet, etc. Control logic and/or data may be transmitted to and from the TV implementing computer system 1200 via communication path 1226.

The TV implementing the computer system 1200 may also be part of an Internet-of-Things system involving a plurality of apparatus modules 102, as described above, for components such as speakers 210a-210f, and/or the Wi-Fi remote 206, and/or the user phone 204. The apparatus modules 102 may comprise computer systems 1200 in their own right, where for example they are each at least equipped with their own wireless network interface microcontroller and RAM, and can receive and transmit signals using Wi-Fi or Bluetooth protocol. Alternatively, such modules 102 may only comprise sensors and transmit/receive data without the presence of RAM and/or their own wireless network interface microcontroller. In this case, any signal processing may be conducted solely onboard the TV central module 104. For the embodiments described herein, the former configuration, with apparatus modules 102 each comprising computer systems 1200 in their own right, is used.

Any applicable output data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), Structured Query Language (SQL), or any other functionally similar representations alone or in combination, and may be used for sending or receiving data (e.g. between any of the apparatus modules 102, the central module 104, and the central repository 104a in FIG. 1). Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Computer system 1200 may be a client or server, accessing or hosting any applications and/or data through any delivery paradigm, including but not limited to remote or distributed cloud computing solutions such as cloud computing environment 1101 which will be explained infra; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

In implementing the central module repository 104a, as an example approach, for storing and accessing its constituent data objects, the TV implementing the computer system 1200 may use an in-memory database with persistence, which may store and access data objects from the primary memory 1208 of the computer system 1200 with a transaction log for persistence being stored in secondary memory 1210. Alternatively, the TV implementing the computer system 1200 may implement only part of the data as an in-memory database, using less primary memory 1208 than as described above, to reduce the in-memory footprint, and may instead store a larger portion of the data as a disk-based database within the secondary memory 1210, where the data may thus be stored in a tiered manner (more frequently accessed data may be stored in primary memory 1208 while less frequently accessed data may be stored in secondary memory 1210, for example).

Alternately, the TV implementing the computer system 1200 may store none of the data in primary memory 1208 or secondary memory 1210, and the computer system 1200 may write data to a separate file archive stored in a cloud network, or in the secondary memory (e.g., in a file on a hard drive in a Raid array 1216, on a USB drive 1218, or other type of secondary memory 1210, etc).

Further, if the apparatus modules 102 are implemented as a separate system 1200, it may utilize a separate wireless network interface microcontroller with processor 1204 and main memory 1208, as well as on-board secondary memory 1210 which may be optionally present, to send data through a wireless network interface 1224, wherein the apparatus modules 102 and central module 104 may comprise entities 1228 present on an internal or external network, collectively forming an Internet-of-Things system, which may be accessed through communications path 1226. Similar sending of data may occur in an analogous manner with regards to the central module repository 104a, and the central module 104.

Figure 11:
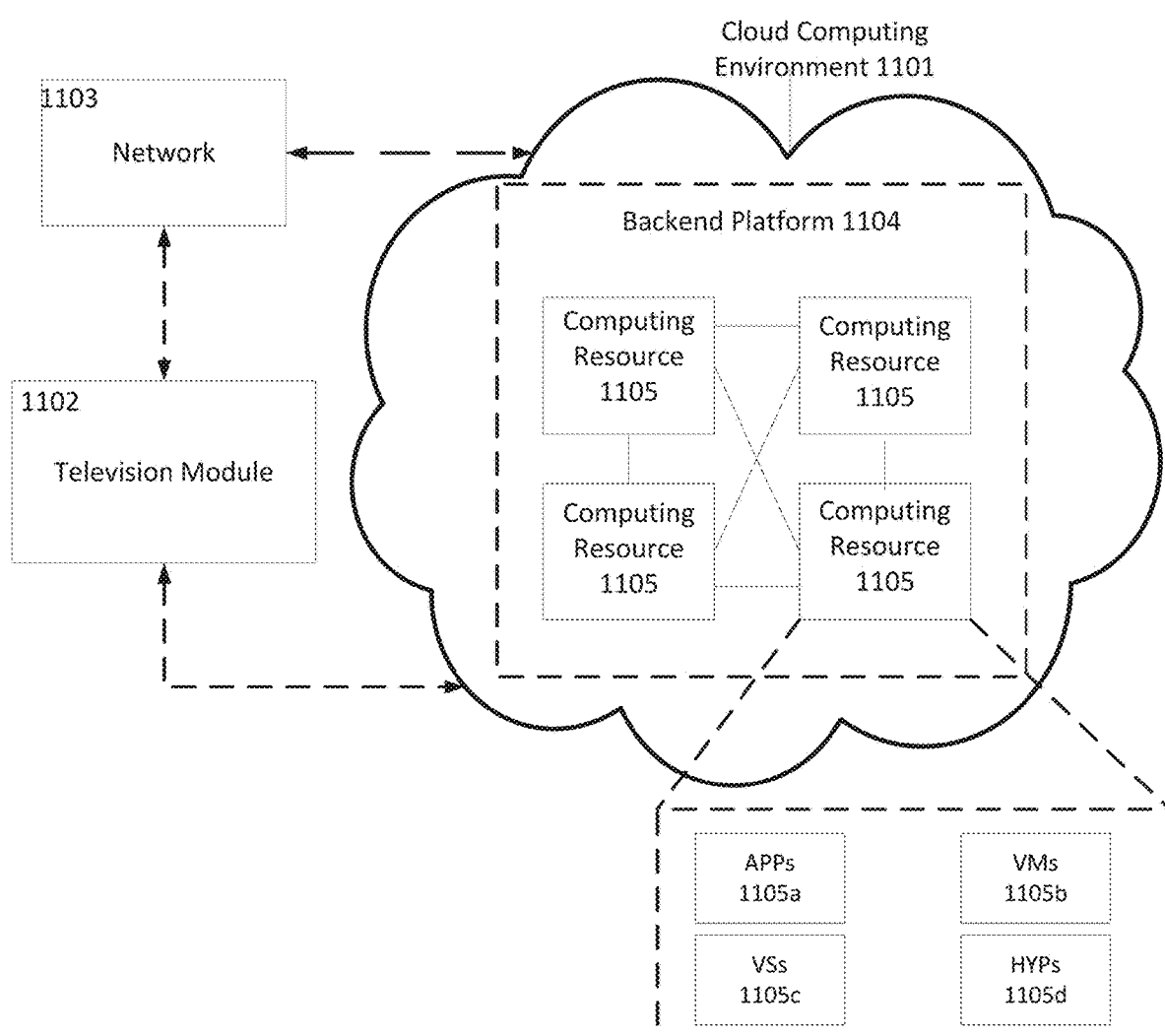
FIG. 11 is a block diagram of an example where a cloud computing environment may be accessed by an apparatus module, according to some embodiments.

As shown in FIG. 11, cloud computing environment 1101 may contain backend platform 1104, in a block diagram of an example environment 1100 in which systems and/or methods described herein may be implemented. The central module 104 of FIG. 1, described above, may also include a host such as cloud computing environment 1101. The cloud computing environment 1101 may be accessed by the TV central module computing system 1102, implementing the same type of computing system 1200 as described above. In this case, the central module computing system 1102 of FIG. 11 may access the cloud computing environment 1101 by a communication or network interface 1124 as shown in FIG. 11, wherein a network gateway 1103 may comprise a remote entity 1228 accessed by the communications path 1226 of the central module computing system (where the three entities 1101, 1102, and 1103 shown in FIG. 11 would collectively correspond to the central module 104 of FIG. 1). Alternately, the computing cloud environment 1101 itself may correspond to a remote entity 1228 in FIG. 12, and may be accessed directly by the central module computing system 1102 through a communications path 626, for example through an application protocol interface (API), eliminating the need for a network gateway 1103 (both options are shown in FIG. 11, wherein the flow path above the central module computing system 1102 uses a network gateway 1103, and the flow path below the central module computing system 1102 connects directly to the cloud computing environment 1101, both shown using dashed bi-directional lines). In addition, as an alternative to wherein data may be transmitted collectively from the central module repository 104a, of central module 104 by the corresponding TV module 1102, data may be transmitted to the cloud computing environment 1101 from apparatus modules 102 individually using their respective wireless network interfaces 1224, in a direct manner sing the API described above.

The devices of the environments 1200 and 100 may be connected through wired connections, wireless connections, or a combination of wired and wireless connections, although as described hereafter a wireless connections embodiment is used.

In an example embodiment, one or more portions of the data transfer environment 100 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

As explained above, the central module 104 of FIG. 1 may have a central module computing system 1102 as shown in FIG. 11 as TV module 1102 which comprises and implements a computer system of the same type as the computer system 1200 as shown in FIG. 12. The apparatus module 102 may access the central module 104 through the central module computing system 1102, wherein the apparatus module 102 may be external network entities 1228 from the perspective of the central module computing system 1102 in an embodiment, and may send data back and forth in the form of data packets through the communications path 1226 of the communications interface 1224 of system 1102, using e.g., TCP/UDP/FTP/HTTPS/HTTP protocol. If a wireless network interface is used, e.g., then transmission of such data may be in conformance with IEEE 802.11 standards for WLAN transmission, or alternatively may use BLUETOOTH protocol. The network interface 1103, may also be a similar communications interface as 1224 with a communications path 1226 for communication of data between the TV module 1102 and the backend platform 1104 of a cloud computing environment 1101 comprising computing resources 1105. Such a backend may be a local server, or hosted remotely, and may also be accessed using e.g., TCP/UDP/FTP/HTTPS/HTTP protocol, WLAN protocol, or Bluetooth protocol, etc.

Alternately or in addition, the apparatus module 102, such as a user phone 204 shown in FIG. 2 may access the central module 104 through a front-end web-application application 1105a (e.g. a web browser application, a web browser extension, proprietary OS application, standalone executable application, command line access shell program, FTP/UDP/TCP/HTTPS/HTTP protocol, etc.) hosted as an application 1105a on a computing resource 1105 (explained infra) within the cloud computing environment 1101 hosted by the central module 104, in an embodiment. The same application is shown corresponding to element 208 in FIG. 2. Such an application may comprise a software as a service (SaaS) type offering, as described above.

Figure 5:
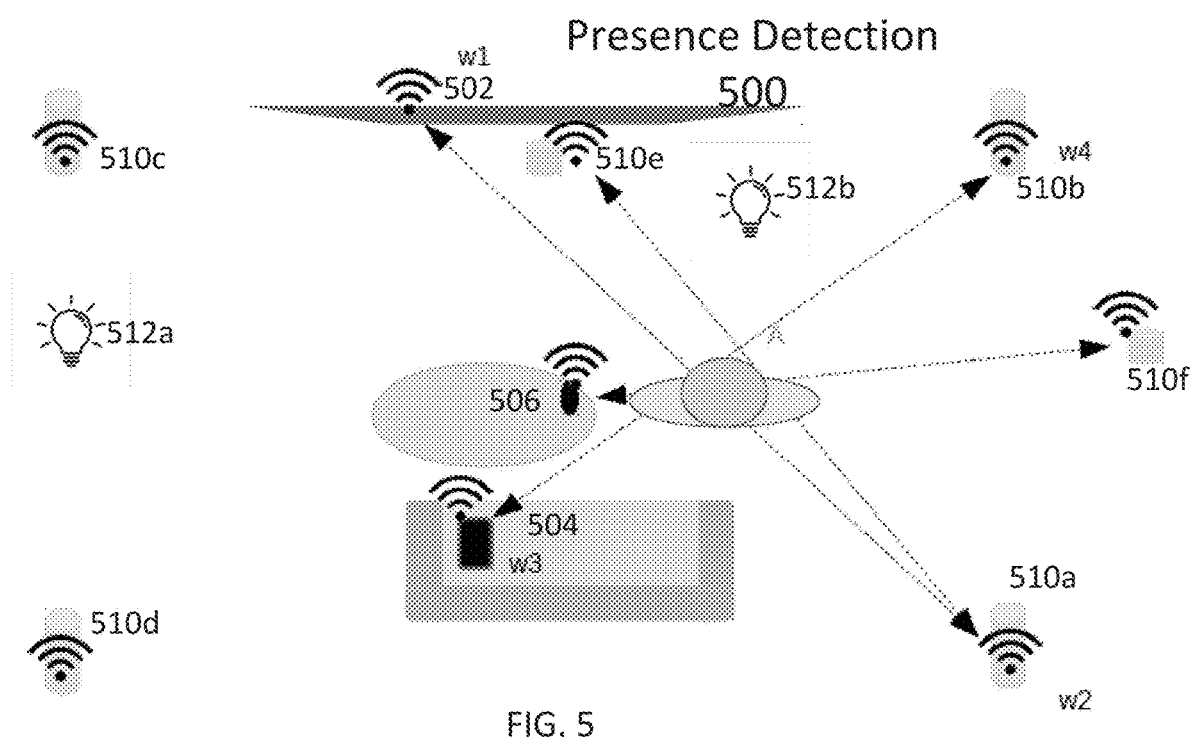
FIG. 5 shows a presence detection mode of a reference setup in a peer-to-peer communication mode between the present sensors/devices, wherein a human may be present in front of a television, according to some embodiments.

The backend platform 1104 in FIG. 5 may include a server or a group of servers. In an embodiment, the backend platform 1104 may host a cloud computing environment 1101. It may be appreciated that the backend platform 1104 may not be cloud-based, or may be partially cloud-based.

The cloud computing environment 1101 includes an environment that delivers computing as a service ("CaaS" as described above), whereby shared resources, services, etc. may be provided to the TV module 1102 and/or the backend platform 1104. This is especially useful in the context of a television, as it adds processing power and additional physical resources for the execution of machine learning algorithms and generation of output in the form of computer graphics or sound/light output or phone application data, as will be described. The cloud computing environment 1101 may provide computation, software, data access, storage, and/or other services that do not require end-user knowledge of a physical location and configuration of a system and/or a device that delivers the services. For example, the central module computing system 1102, as well as apparatus module 102, may receive data stored within or hosted on a database within computing resources 1105 within the backend platform 1104, through an application protocol interface (API) or any of the various communication protocols previously listed. The cloud computing environment 1101 may include computing resources 1105.

Each computing resource 1105 includes one or more personal computers, workstations, computers, server devices, or other types of computation and/or communication devices of the type such as computer system 1200 described above. The computing resource(s) 1105 may host the backend platform 1104. The cloud computing resources may include compute instances executing in the cloud computing resources 1105. The cloud computing resources 1105 may communicate with other cloud computing resources 1105 via wired connections, wireless connections, or a combination of wired or wireless connections.

Computing resources 1105 may include a group of cloud resources, such as one or more applications ("APPs") 1105a, one or more virtual machines ("VMs") 1105b, virtualized storage ("VS") 1105c, and one or more hypervisors ("HYPs") 1105d.

An application 1105a may include one or more software applications that may be provided to or accessed by a computer system 1200. In an embodiment, the central module 104 may only include a cloud computing environment 1101 executing locally on a TV implementing a computer system 1200 in the form of the central module computing system 1102. The application 1105a may include software associated with backend platform 1104 and/or any other software configured to be provided across the cloud computing environment 1101 (e.g. to an apparatus module 102). The application 1105a may send/receive information from one or more other applications 1105a, via one or more of the virtual machines 1105b. Computing resources 1105 may be able to access each other's applications 1105a through virtual machines 1105b, in this manner.

Virtual machine 1105b may include a software implementation of a machine (e.g., a computer) that executes programs like a physical machine. Virtual machine 1105b may be either a system virtual machine or a process virtual machine. A system virtual machine may provide a complete system platform that supports execution of a complete operating system (OS). A process virtual machine may execute a single program and may support a single process.

The virtual machine 1105*b* may execute on behalf of a user (e.g., the administrator of the central module 104) and/or on behalf of one or more other backend platforms 1104, and may manage infrastructure of cloud computing environment 1101, such as data management, synchronization, or long duration data transfers.

Virtualized storage 1105*c* may include one or more storage systems and/or one or more devices that use virtualization techniques within the storage systems or devices of computing resource 1105. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the central module 104 flexibility in how they manage storage for evaluation data for processing of data retrieved from apparatus modules 102 (as will be explained infra). File virtualization may eliminate dependencies between data accessed at a file level and location where files are physically stored. This manner of block and file virtualization may enable optimization of storage use, server consolidation, and/or performance of non-disruptive file migrations.

Hypervisor 1105*d* may provide hardware virtualization techniques that allow multiple operations systems (e.g., "guest operating systems") to execute concurrently on a host computer, such as computing resource 1105, which may include a computing system of the type of computing system 1200, and can in this manner host a virtualized hardware of a central module computing system 1102. Hypervisor 1105*d* may present a virtual operating platform to the guest operating systems, and may manage multiple instances of a variety of operating systems as these "guest operating systems," which may share virtualized hardware resource, such as RAM, which may for instance access the data in the form of a database of the central module repository (104*a* in FIG. 1). Alternately, secondary memory may be accessed using virtualized storage 1105*c*, or on physical storage, such as the hard disk drive 1212, of a computing resource 1105 of the type of computing system as computing system 1200. In embodiments heretofore described, using a combination of RAM and secondary memory to access the database, such that a portion of the database may be in-memory and a portion of the database stored in files, is also envisioned.

FIGS. 2 through 5 show different facets of how an embodiment of an exemplary reference set up may be used for presence detection. With reference to FIG. 2, as described above, television 202 may correspond to a central module 104, and the other components such as speakers 210*a*-210*f*, WiFi remote 206, and a user phone 204 may each correspond to a separate apparatus module 102 as shown in FIG. 1. As described above, each of the apparatus modules 102 may have its own wireless network interface and accompanying microcontroller, wherein the wireless network interface may include, e.g., a USB interface, or an interface card or chip, and an internal antenna. In an embodiment, such an antenna may be an omnidirectional antenna.

Figure 3:
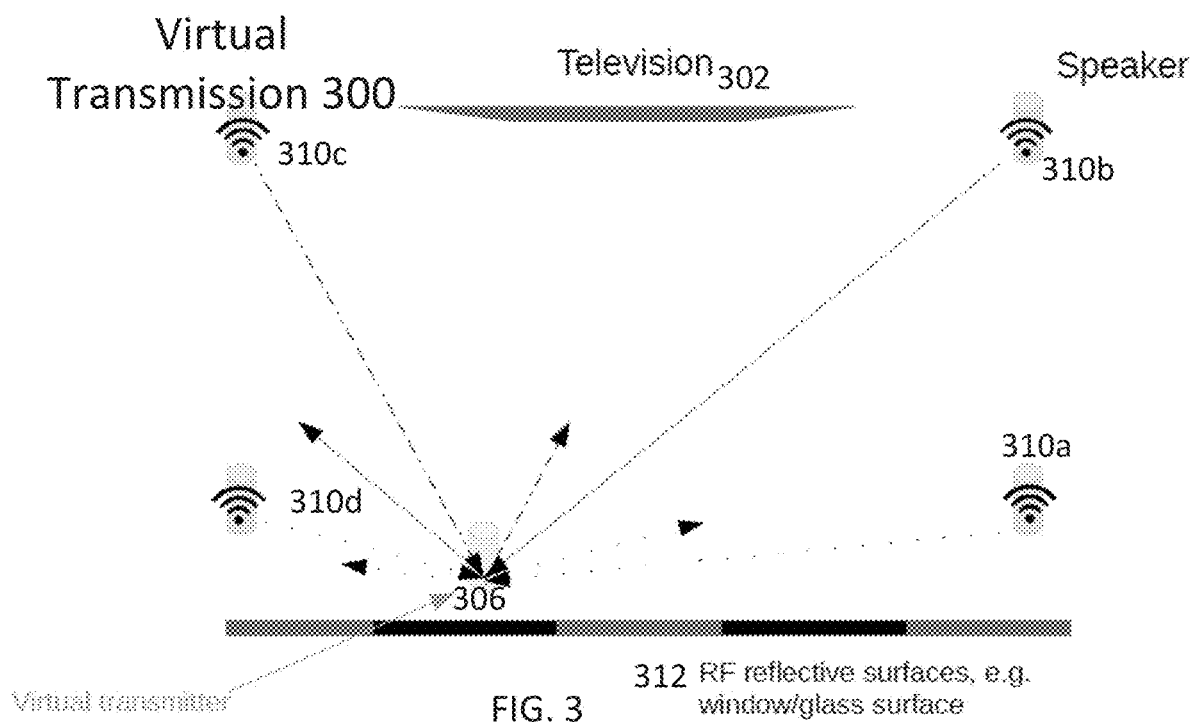
FIG. 3 is a reference setup showing virtual transmitter capabilities of each of the sensors/devices, and outflows as a result of transmissions from a virtual transmitter, according to some embodiments.

In this manner, as shown in FIG. 3, each of these apparatus modules 102 may form a virtual transmitter in its own right, wherein the internal antenna of each device can be used to broadcast a signal in multiple directions. In the embodiment using the omnidirectional antenna, as shown in FIG. 3, such a signal can be broadcast in all directions. Additionally, the presence of Radio Frequency (wherein WiFi and BLUETOOTH signals are transmitted within the Radio Frequency range) reflective surfaces such as glass, etc., only serves to enhance the signal further by reflecting it throughout e.g. a room where the setup is used.

In an embodiment, the network interface 1224 may support transmission in accordance with IEEE 802.11 protocols using the 2.4 ghz or 5 ghz frequencies, extending to a range of about 150 feet, and 50 feet, respectively. Each virtual transmitter may form a virtual access point, wherein signal transmission is then occurring at multiple points throughout the room in the reference set-up as shown in FIG. 2. In this case, because of the numerous access points present within the perimeter of zone 212 as shown in FIG. 2, a high-resolution detection zone is created, where the transmission of multiple wireless signals allows for easy triangulation of signal in such a zone. In particular, for example, such signals broadcasted from each of the apparatus modules 102 may be received by the network interface 1224 of all other apparatus modules 102, or the television 202, in the form of received signal strength indicator (RSSI). Such an indicator can be translated by the network interface controller into an absolute measurement of decibels relative to a milliwatt (dbM).

Speakers 210*a*-210*d*, as well as WiFi remote 206, user phone 204, etc., may be displaced at different three-dimensional locations relative to each other. In an embodiment, speakers 210*a*-210*d* may be in a plane at the same height. In this manner, if for example four of these speakers act as virtual transmitters and broadcast wireless signals in an omnidirectional manner, a wireless network interface receiving these signals (e.g. the interface of the television 202) can be used to record these dbM measurements and store them in the central module repository 104*a*. From these stored dbM measurements, a composite map of signal strength could be created and stored in the central module repository 104*a*. Especially where the physical distance between television 202 and speakers 210*a*-210*d* is known, the corresponding direction strength of the wireless signals can be correlated with the respective locations from which they were sent, and provide a strong mapping detection for a particular height or Z-direction-coordinate, since the multiple sensor measurements are corroborated with each other at the same height.

Alternatively, other devices such as the remote 206 which may have an accelerometer and gyroscope may also be used in a similar manner, or apparatus modules 102 such as speakers 210*a*-210*d* may also have GPS sensors or other positioning sensors which can output a sending position to a receiving wireless network interface 1224, such as that of television 202. Then, the television 202, which may also have a corresponding GPS, can determine the corresponding distance between the transmitting speaker or other transmitting device and the television, and can correlate this distance in three dimensions with the dBM data reading. In this manner, a map in three-dimensions can be made of signal strength. Also or alternatively, a user cell phone 204 may use in-built sensors such as an accelerometer or gyroscope to determine the relative position of the phone. Further, such a phone 204 may receive signals from a multitude of wireless transmitting points (e.g. speakers 210*a*-210*f*) and may through interpolation of its position and received signal strength be able to approximate the distance between each transmitting point and the phone, and thus be able to estimate the position of each transmitting point. Then, the television 202 may be able to receive this data from an application 208 on the user phone, and store it in repository 104*a*. This application, in an embodiment, may be a cloud application 1115*a*, as described above.

In particular, because a plurality of WiFi transmitting devices are present within the high-resolution zone 212, there is a higher degree of overlap of signals allowing for a more detailed and higher resolution composite map to be made. Such a map may be made using the processing power of a GPU as described above, and may be made also using a cloud network, wherein data from the central module repository 104a may be transmitted to the cloud network backend resources 1115 for processing as described above. Because as described above the speakers 210a-210d may be present at the same height in an embodiment, the three dimensional composite map made from just these devices would only be present in two dimensions in data at a high resolution, since all of these speakers are at the same height. Thus the other devices broadcasting signals such as WiFi remote 206, center speaker 210e, user phone 204, and subwoofer 210f are important as these are at different heights and aid in sending signal strength at a multitude of different points along the height axis, wherein the composite map can then truly be constructed in 3 dimensions, with three dimensions of data, combined with the high-resolution map in two-dimensions from the speakers 210a-210d. It is also to be noted that even though the embodiments herein describe the use of Wi-Fi signals, other RF signals such as BLUETOOTH signals can also be used in substantially the same manner.

Figure 4:
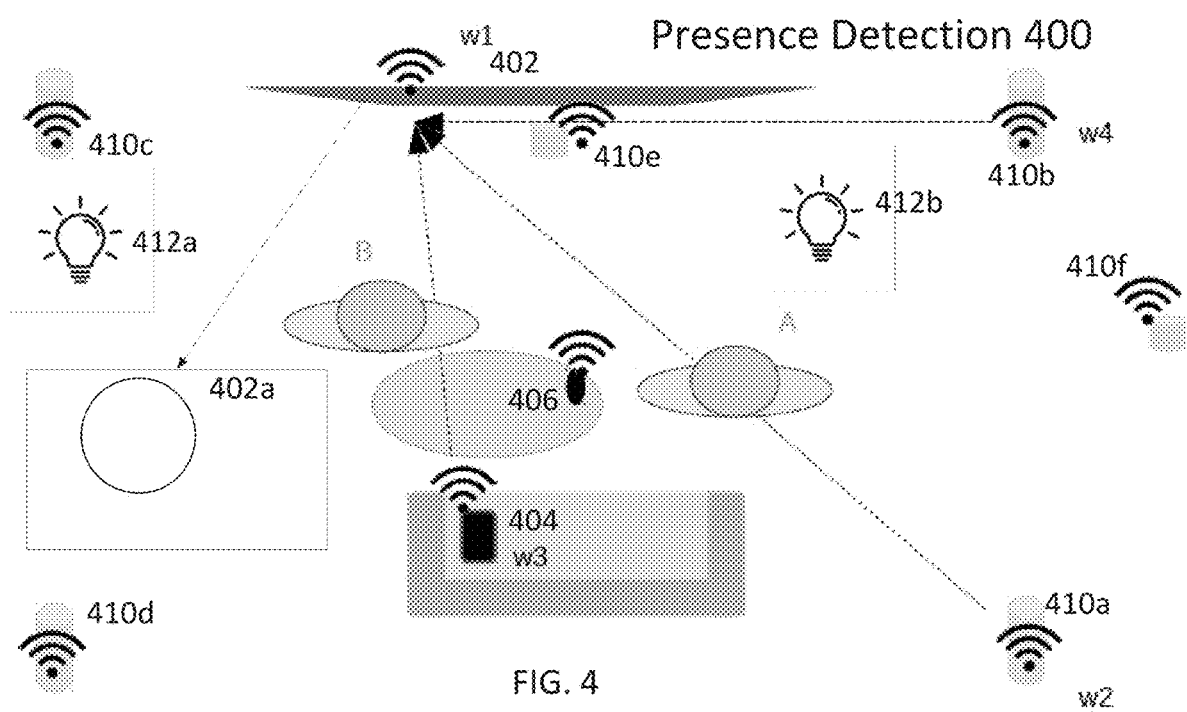
FIG. 4 shows a presence detection mode of a reference setup, wherein the transmission of sensors in the setup occurs with humans present in front of a television, according to some embodiments.

FIG. 4 shows an embodiment 400 of how presence detection of one or more humans in front of the TV may occur with the reference setup as shown in FIG. 2. In particular, the signal strength may be blocked or received at a much lower degree due to the presence of a human in the direction of transmission. For example, a scenario when a human A is directly in the direction of transmission of the Wi-Fi signal from the speaker 410a to the television 402 can be considered. When this occurs, the RSSI and corresponding dBm of the signal from 410a to 402 is lower. Further, there may be software in the RAM or secondary memory 1210 of apparatus modules 102 to control the wireless network interface 1224 such that the signal may be boosted, or a signal can be forced to send. This is unique because usually data output from a software application is pushed to a stack, where per 802.11 protocols the data packets must then be routed through the network interface layer, through the software controlling the network interface controller, to be sent out wirelessly.

In an embodiment, the television 202 or other receiving entity, if the signal is detected as lower than normal (e.g. with human A blocking it above), can send a signal to a transmitting apparatus module (e.g. speaker 410a) to force-send a boosted signal, wherein the software not only pushes data but also controls its transmission through the network interface layer, and can help expedite sending of such a boosted signal from its virtual transmitter as shown in FIG. 3. Thus when a boosted signal is sent, the position of 410a can be verified to a greater degree, and data can be sent from the speaker to the TV. Conversely, the TV using such a boosted signal can also send data (e.g. sound) to be played by the speakers even though a human A is present directly in the direction of transmission. In this way, by varying signal strength and times from individual transmitters it is possible to pick up the main signal and immediately reflected signals from each transmission source to provide reliable input data.

In addition to boosted signals, an ad-hoc mode as shown in FIG. 5 may also be used to greatly enhance signal reception and can be used as a reference point for comparison. In FIG. 4, as shown, the transmission from all apparatus modules 102 is to one receiving point, television 202, only. In this case, speaker 410a is blocked by human A, and it may need to be boosted to get through to the television 202. In contrast, in FIG. 5, the transmission from speaker 510a may be received by several apparatus modules 102 at once. Information regarding the reception including transmitting module, receiving module, RSSI, dBm, direction, accelerometer/gyroscope, other sensor readings, etc., may then be transmitted from the respective receiving apparatus modules to the television 202, which can store this information in the central module repository 104a. Alternatively, the reception information can be transmitted as described above from the receiving apparatus module 102 directly to a cloud network, where it can be stored in a repository of a computing resource 1105. In this manner, many signals from the same transmitter can be received. As a result, especially within the high-resolution detection zone 212, the number of transmissions and receptions increases rapidly, and allows for an even higher resolution of Wi-Fi signal strength in three-dimensions to be achieved. Thus, as described above from a variety of apparatus modules 1022, input is collected in step 909 of FIG. 9, and stored in the central module repository 104a, at step 911 of FIG. 9.

Figure 9:
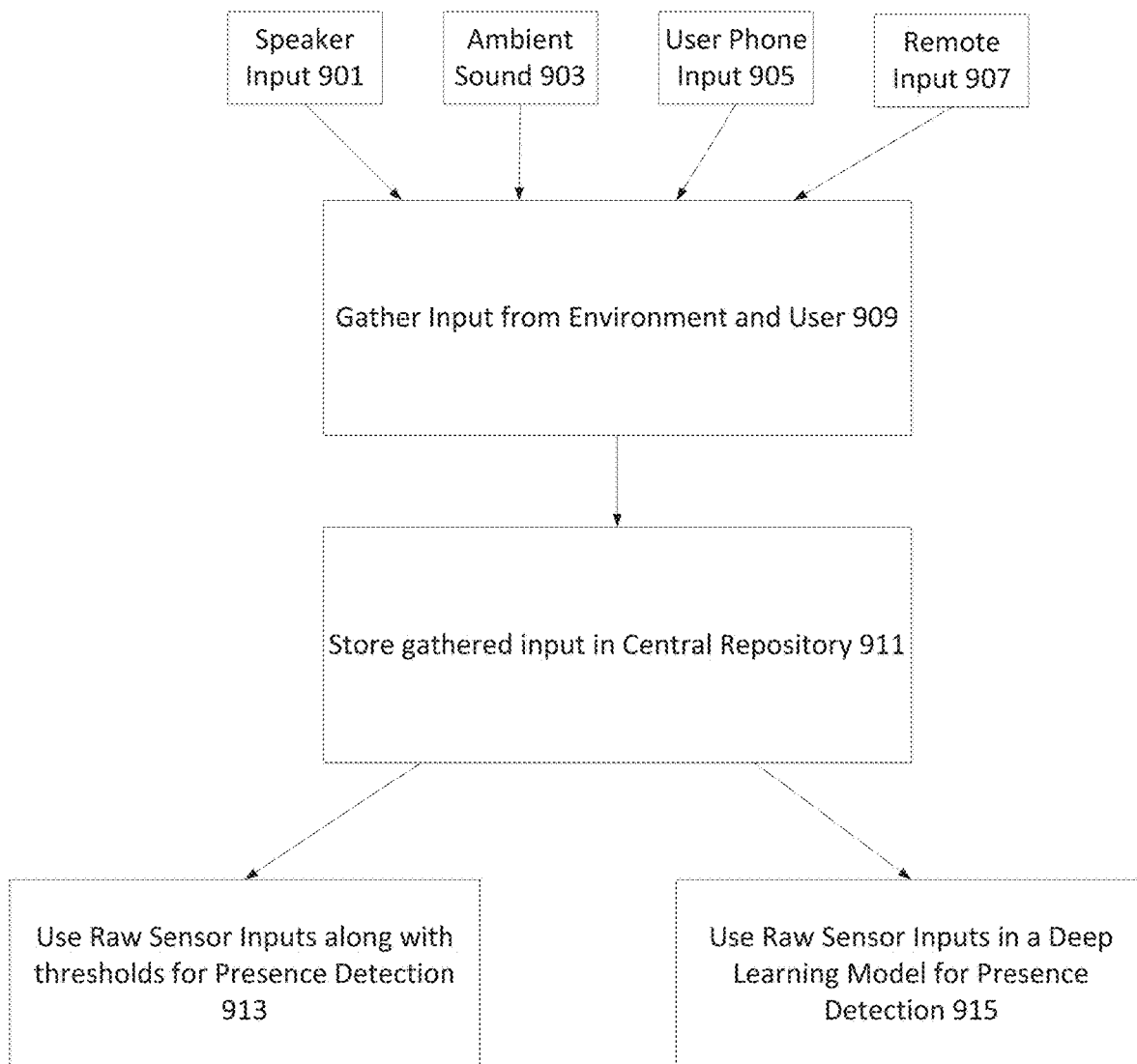
FIG. 9 is a flow chart illustrating a process for an embodiment where input is gathered from numerous sensors/devices in a reference setup in front of a television, and then performing human presence detection in one of two modes, according to some embodiments.

From the resolution of detection described in FIGS. 2-5 above, baseline data may be accumulated (transmission and reception signals when there are no humans present in the region proximate to the TV as shown in FIG. 2), and this data as written in the central module repository 104a or stored on computing resources 1115, may be compared to the case of transmission and reception signals when there are humans present in the region proximate to the TV in step 913 of FIG. 9. In an embodiment, simple logistical regression or a decision tree may be used, wherein an overall first score may be computed representing the baseline 3-d detection of Wi-Fi signal with no humans present. Then, a second sample detected overall score of three dimensional detection of the Wi-Fi signal may be compared to this first score, and if the ratio of the two meets a certain threshold below or above 1, a human may be deemed to be present.

Figure 8:
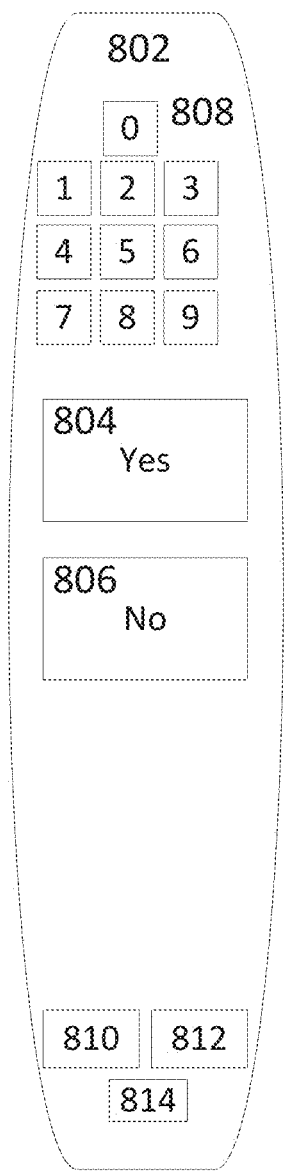
FIG. 8 is an exemplary embodiment of an WiFi and infrared remote control, with buttons enabling a user of the television to provide user input to the television, according to some embodiments

In an embodiment, further Boolean logic may be used, to account for the movement and handling of a cell phone 204 or a remote 206. For example, an embodiment of the remote 206 is shown in FIG. 8, with multiple buttons 806-807 and an IR transmitter where the numeral 802 is located. A baseline score may be present with regard to a composite measurement of movement of the phone detected by the accelerometer, gyroscope, key presses over a substantial period of time etc., for both the cell phone 204 and the remote 206. For the remote 206, the score might also include detection of IR transmission activity over a period of time by the television 202. Then, when the composite score is above a threshold compared to the baseline score, one or more humans may be deemed to be present. In this case, if the cell phone 204 of the reference setup 200 is detected as tilted to an almost vertical angle when the phone cannot normally lie vertically in a resting position, and keys are detected as pressed over an extended period of time, it would be determined that a human is using the cell phone 204 in front of the TV, and this would be reflected in the measured score compared to the baseline score. The same is applicable for a remote 206, where for example the lifting up of a remote 206 and rapid key depressing over a period of time (e.g. 2 minutes) would normally indicate human use.

Machine learning techniques may be useful as a dataset that is accumulated for multiple humans in front of the TV, and can capture the trends associated with features that tend to indicate human presence, and further the number of humans or the type of human present. In particular, in this case, received signals form a part of the Wi-Fi signature, e.g.

received signals from 210d, 210c, 210b etc., where in the ad hoc mode, received signal destinations are also recorded (as compared to the single receiver mode in FIG. 4, where only television 202 is receiving the signals). Additionally, gyroscope and accelerometer readings from the cellphone, key depressing readings from the cellphone, gyroscope and accelerometer readings from the Wi-Fi remote, all of which may be detected in transmissions to television 202, also form features of the Wi-Fi signature, and are stored in central module repository 104a. In an embodiment, as shown by element 903 in FIG. 9, at least one of the speakers present in reference setup 200 in FIG. 2 may also have an in-built microphone, and can record and transmit ambient sound over a period of time to be stored in the central repository 104a and also form part of the Wi-Fi signature, and can also be included in the baseline and measured scores described above as a further basis of comparison.

In an embodiment a machine learning classifier can also be used for thresholds of presence detection in step 913 of FIG. 9. In particular, for each element of the Wi-Fi signature, a support vector machine (SVM) could be used to construct an hyper plane in N dimensions between two classes (present/absent), indicating the presence or absence of humans in front of the TV, with each dimension corresponding to an aspect of the Wi-Fi signature. However, because as described above, it is determined that there is a user present in front of the TV when a user cell phone such as 204 or a remote such as 206 is handled in a certain manner, in an embodiment Boolean logic may be used with three separate SVM's, where there is a SVM for all aspects of the Wi-Fi signature except for those dealing with the cell phone and remote sensor readings, for each of which separate hyperplanes may be created. Then, the result of all the SVM's could be put together with OR statements, such that if the presence of cell phone use in a certain manner or a remote in a certain manner is captured by the SVM, then the result of one or more humans in front of a TV can be positively indicated.

In an embodiment, a neural network with hidden layers and backpropagation may be used as a machine learning classifier for the inputs of the Wi-Fi signature, in determining the presence of one or more humans in front of a television such as 202. By using such a classification technique, it may be possible to create a system of nodes with weights. This system of nodes with weights may be used in the to give a reliable prediction, based on the inputs of the Wi-Fi signature, on whether one or more humans are present in front of the television (in the form of a YES, or a NO response). Based on this predictive analysis, the machine learning logic of the neural network, including the system and nodes shown in e.g., FIG. 6A., may be executed by the processor of the TV central module 104 on the data stored in the central module repository 104a, or alternatively the data stored in the central module repository 104a may be sent to a cloud environment 1101 to be operated on utilizing multiple computer resource systems 1105. Accordingly, based on the prediction by such a technique, a decision for the presence or absence of one or more humans in front of the TV may be rendered in step 915 of FIG. 9.

Figure 6A:
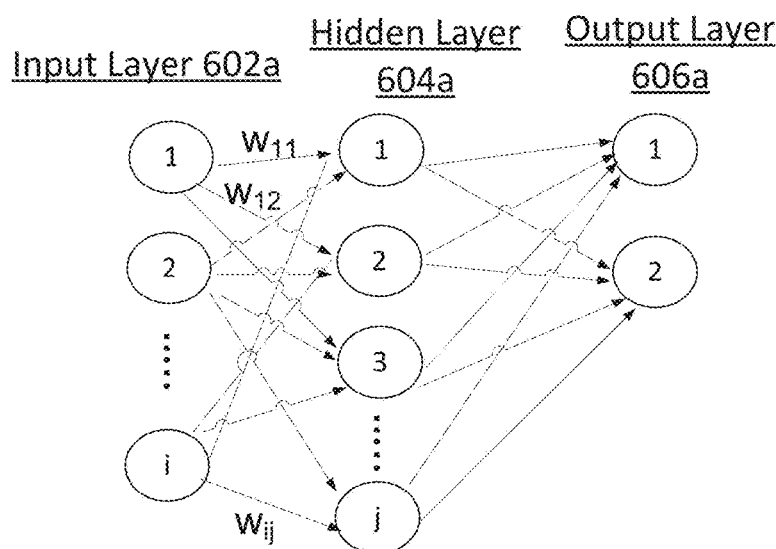
FIG. 6A is a layer-by-layer flow diagram of an exemplary deep learning neural network model with back-propagation that may be used for performing human presence detection based on stored data from the sensors/devices of a reference setup, according to some embodiments.

The different components of the neural network model shown in FIG. 6A will herein be explained. The input layer 602A contains nodes 1 to i, which represent inputs into the model. Each of these nodes corresponds to a different aspect of the Wi-Fi signature as described above. For example, node 1 may represent the signal received from speaker 210a to 210e in FIG. 2, node 2 may represent the signal received from speaker 210a to 210c, and so on. Output layer 606a may only include two nodes, node 1 and node 2. Node 1 may correspond to a result of 'YES' and node 2 may correspond to a result of 'NO' or vice versa, wherein based on the inputs and weights from each node to the other ($w_{ij}$ as shown in FIG. 6A), the results of the output layer are tabulated, and the node (1 or 2) in the output layer with the greater result is outputted as the outcome of the predictive analysis.

In traversing from the input layer 602A to the output layer 606A, there may also be several hidden layers 604A present. The number of hidden layers 604A may be preset at one or may be a plurality of layers. If the number of hidden layers 604A is one (such as shown in FIG. 6A), the number of neurons in the hidden layer may be calculated as the mean of the number of neurons in the input and output layers. This is derived from an empirically-based rule of thumb in ease of calculating weights across layers. According to an additional rule of thumb, in an embodiment to prevent overfitting, where the number of neurons in input layer 602A is $N_i$ and the number of neurons in the output layer is $N_o$, and the number of samples in the training data set, from the aggregated metadata is $N_s$, then the number of neurons $N_h$ in one hidden layer may be kept below $$N_h = \frac{N_s}{(\alpha * (N_i + N_o))}, \quad \text{(equation 1)}$$

where $\alpha$ is a scaling factor (typically ranging from 2-10). In this manner, the number of free parameters in the model may be limited to a small portion of the degrees of freedom in the training data, in order to prevent overfitting.

From the input layer, based on the weights from each node in the input layer 602a to the hidden layer 604a shown in FIG. 5A, there may be a sigmoidal transfer function in going from the input layer 602a to the hidden layer 604a. Initially, the weights $w_{ij}$ may be initialized to random values between 0 and 1. An input signal may then be propagated according to these weights (forward-propagation), wherein the hidden layer 604A forms the first outputs for the neurons of the input layer 602A. For example, inputs given as neuron 1 and 2 in the input layer 602A may be multiplied respectively by weights $w_{11}$ and $w_{12}$, respectively, and summed to form the output to the hidden layer 604A. Then the node 1 at the hidden layer 604A may take this net value (Value of Input Layer Node 1*$w_{11}$+Value of Input Layer Node 2*$w_{12}$) and transfer this activation value to see what the neuron output onwards to the output layer actually is. At each output layer (hidden layer 604A with respect to input layer 602A, and output layer 606A with respect to hidden layer 604A) transfer functions comprising the sigmoid activation function $$S(x) = \frac{1}{1 + e^{-x}},$$

hyperbolic tangent function $$\tanh x = \frac{e^{2x} - 1}{e^{2x} + 1},$$

or smooth rectified linear unit (SmoothReLU) function $f(x) = \log(1 + e^x)$ may be used to transfer outputs.

In the example above, the output given from the input layer 602A to neuron 1 of the hidden layer 405A (Value of Input Layer Node $1*w_{11}$+Value of Input Layer Node $2*w_{12}$) would be inputted as the activation value to be transferred at the hidden layer 604A to one of the transfer functions described above, and the output would form the value of neuron 1 of the hidden layer 604A to be given onward as input to the output layer 606A, and multiplied by respective weights to the neurons 1 and 2 of the output layer. In this manner, full forward propagation of input nodes 1 through I in the input layer 602a may be achieved to the output layer 606a.

Then, to conduct backpropagation, error is calculated between the expected outputs and the outputs forward propagated from the network. In training the neural network, k-fold cross validation, as described above, may be used, particularly when the data sets are small. For k-fold cross-validation, for example, there could be an aggregated set of meta-data of humans present (YES) or not present (NO) with respect to different Wi-Fi signatures, comprising all the components described above. This set of meta-data may be shuffled and split into a k number of groups (e.g., 5 groups if k is 5, each holding a particular number of results (YES/NO) and corresponding Wi-Fi signatures). Then, for each unique group, the group can be held out as a test data set, with the remaining groups of aggregated metadata being used to train the classifier. Finally, based on the training, the accuracy with respect to the test group can be evaluated. One group may be held for testing and the others may be used to train the model. In so training, a '1' value is reserved for neuron 1 and a '0' value is reserved for neuron 2 of the output layer 606A if the result is a 'YES' for detection of presence of one or more humans in front of the TV. Conversely a '0' value is reserved for neuron 1 and a '0' value is reserved for neuron 2 if the result is a 'NO' for applicant product eligibility. In this manner, error is calculated between the expected outputs of 1,0 so described, and the outputs actually forward propagated by the network (initially by random weights assigned as described above). To transfer the error, the error signal to propagate backwards through the network is given by error=(expected−output) *transfer_derivative(output), wherein transfer_derivative is the derivative of the transfer function used (sigmoid, hyperbolic, or SmoothReLU). The error signal for a neuron in the hidden layer 604A is then calculated as the weighted error of each neuron in the output layer, according to the weights from the output layer to the neuron in the hidden layer 604A. Similarly, the error signal from the hidden layer is then propagated back to the input layer 602A. Once the errors are calculated for each neuron in the network via the back propagation method described, the errors are used to update the weights according to the formula new_weight=old_weight+learning_rate*error*input. Here, the old_weight variable is the previous given weight in the model, the learning_rate variable is a value from 0 to 1 that specifies how much to change the old weight to correct for the error, the error variable is the error calculated by the backpropagation procedure, and the input variable is the value of the input that caused the error. Over time, this model can be developed to form a robust prediction analysis, and the rules governing its nodes, weights, and functions may be written in central module repository 104a, such that it may be used in step 915 of FIG. 9 for accurate detection of human presence.

Figure 6B:
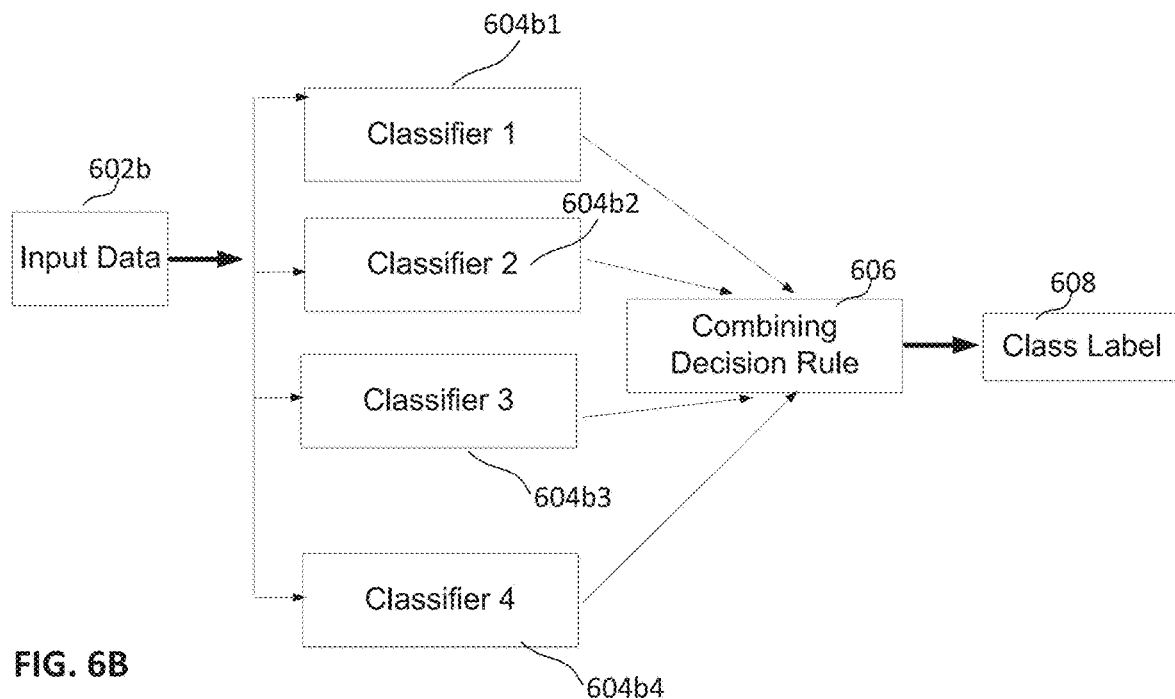
FIG. 6B is a flow diagram of an exemplary machine learning model utilizing multiple classifiers to form a composite combined classifier for performing human presence detection based on stored data from the sensors/devices of a reference setup, according to some embodiments.

Furthermore, instead of step 915 in FIG. 9, a multitude of machine learning classifying techniques described above may be combined to form a composite machine learning classifier as shown in FIG. 6B. Such techniques may include SVM, random-forest, decision trees, neural network, etc. As shown in this figure the aggregated metadata, which forms the input data 602b, may be inputted into multiple different machine learning classifiers 604b1, 604b2, etc. A combining decision rule 606, which may combine votes from multiple classifiers, can then finally decide a class label (YES or NO for eligibility) in step 608, which can be returned as the outcome from the ensemble classifier. An example combining decision rule 606 may be a majority vote rule. Especially when models are equally well performing, such a combining decision rule can help balance out their individual weaknesses, and can make for a more robust classifier overall.

In terms of the aggregated metadata and parameters used in the machine learning or comparative/logistic regression models described above, this also may be gathered or set in a number of different ways. Firstly, there may be an embodiment where the parameters have already been extensively tested for by domain experts in a reference set up such as shown in FIG. 2, with a predetermined orientation and spacing of apparatus modules 102 relative to a central module television 104. In an embodiment, these parameters may be hardcoded.

Secondly, parameters may be learned from manual labeled data, that is collected in live-user tests, where conditions are rigidly controlled for, such that e.g., ambient noise isn't due to a dog nearby, or a bird crashing into the window of a set-up, but rather clearly helps compare a baseline situation with when a human is present.

In both embodiments above, whether by domain experts or learned from manual labeled data, this can supplement learning parameters by testing on individual user data. Alternatively, only testing on individual user data can be used. To accurately test on user data, the display of the television, as shown, e.g., in 402a of FIG. 4 may display the GUI shown in FIG. 7A from time to time, or at predetermined intervals. The user, using the remote 406 as shown in FIG. 8, with yes/no buttons 804 and 806, respectively, may be able to respond to such a prompt and create a data point corresponding to a Wi-Fi signature. Elements 810, 812, and 814 in FIG. 8 represent internal components of the remote, including the WiFi transmission module, accelerometer, and gyroscope, respectively.

The same GUI in FIG. 7A may alternatively be able to be displayed in an application on the user's phone, prompted by the television 402, wherein such an application may be of the type of cloud application 1105a as described above. In this case too, the user's response in terms of yes or no would be able to be received by the central module 104, with the result recorded in the central module repository 104a, creating a data point corresponding to a particular Wi-Fi signature. In this manner, over time, a vast data set comprising aggregated training metadata can be accumulated. For even more accuracy in training, the datasets of multiple users, with their permission, may be able to be shared in the cloud over a cloud network 1101, wherein computing resources 1105 can store and aggregate data from multiple users in databases and can further develop models to fine tune distinguishing of human presence in front of a TV.

Figure 10:
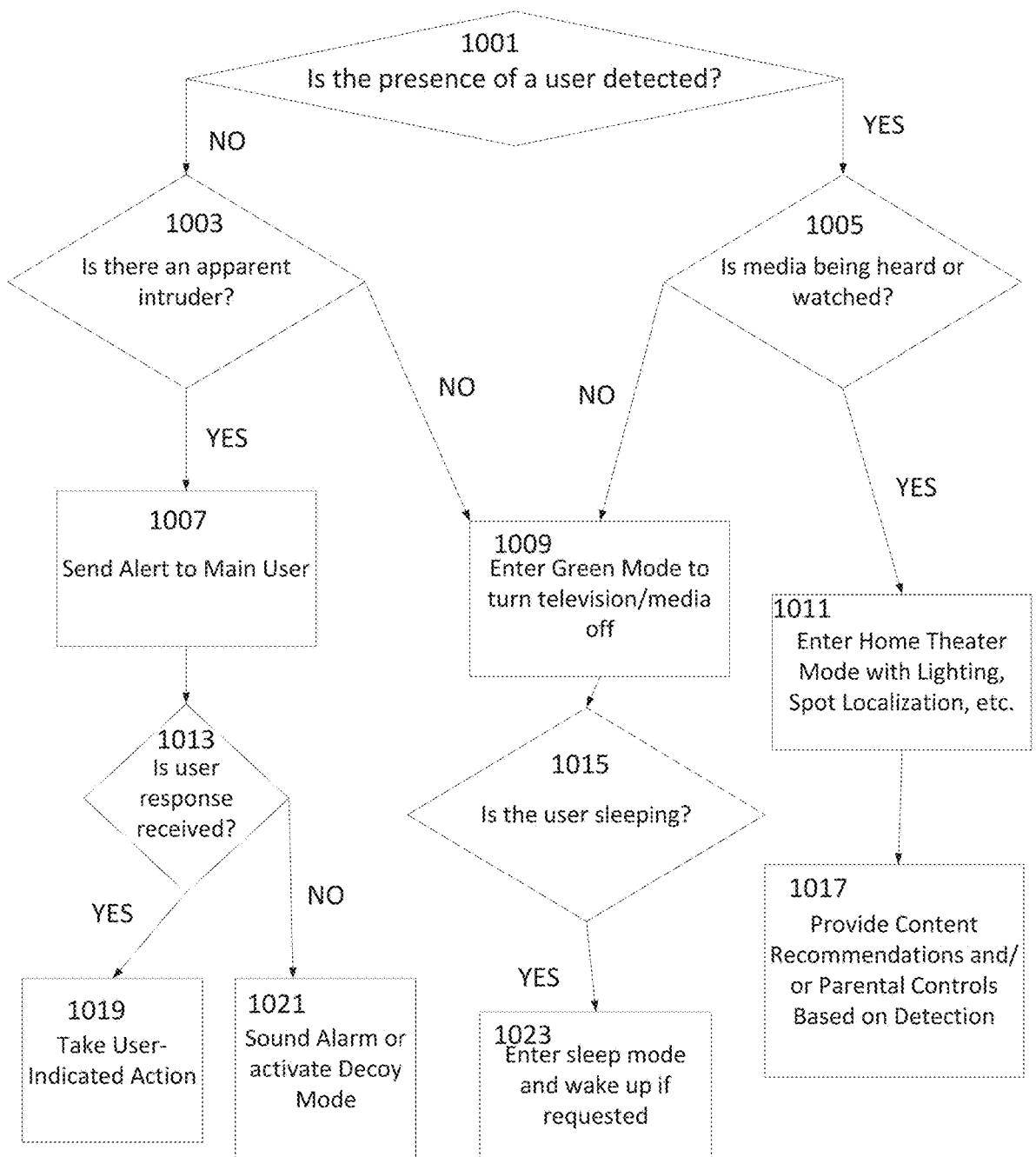
FIG. 10 is a flow chart illustrating a process for an embodiment for actions that may be taken by the sensors/devices or television based on the presence or absence of a user in front of the television, according to some embodiments.

Finally, after the presence or absence of one or humans in front of a TV has been determined by steps 913/915 of FIG. 9, based on the presence of a user detected at step 1001 of FIG. 10, further actions may be taken by the IoT (Internet of Things) system comprising the central module 104 and the apparatus modules 102. In particular, if one or more humans are detected in front of the TV, at step 1005 the system determines if media is being heard or watched. In particular, a television such as television 202 has the capability of knowing which program is being watched, and thus is able to determine whether media is being watched on the TV. Similarly, using the internal microphone in at least one of the speakers shown in FIG. 2 to record ambient sound, it can be determined whether the user is listening to media through the speakers (e.g. through a BLUETOOTH or wireless connection). In this case, if it is determined the user is consuming media, based on the above detection of the Wi-Fi signal in three dimensions a location where the user, or users, might be present, is identified through drops in the signal compared to a baseline measurement. Once such a position is identified, the device remote 206 may enter a full-power mode so that the user may maintain full use of the remote, and the system may enter a home theater mode. In this mode the IoT system may adjust several components to provide an optimum experience to the user based on their location. For example, in FIG. 4, the speakers 410a-410f and lights 412a-412b may be on a stage that is controllable in the up-to-down and left-to-right directions. This stage may be able to be controlled by the IoT system, wherein a signal sent by television 402 to the speakers and the lights to be arranged in such a position that sound reaches users A and B equally in all directions.

This can further be customized by the user, for example, through an application connecting the television 402 to the phone 404, such as an application 1005a, wherein the user can specify they would like to adjust bass, treble, or other sound settings. For example, if the users A and B would like to enter a deep bass mode, they can enter such a mode by pressing a yes/no key similar to 705a and 707a, on a question prompt similar to that of GUI 700a, instead asking "Do you want to enter a bass mode?" If the response to such a prompt is Yes by the user, then the bass sound on the rear speakers 410d and 410a may be increased by the television 402 relative to location where users A and B are present. Instead of buttons yes and no 705a and 707a, sliders might also be included to adjust the bass/treble, or volume levels, etc.

As an alternative or additionally, if the television detects, e.g., that the user is watching a TV show or a movie, the television may instruct the lights 412a-412b to adjust position in the up-to-down or left-to-right direction, and may change the hue of or the intensity of such lights to provide an optimal viewing experience for the user. The user may be additionally able to choose his or her preferred color or intensity through sliders similar to those mentioned above in the locations of 705a and 707a on a GUI similar to 700a. In addition, in another embodiment where speakers or apparatus modules 102 are movable manually, a graphic might be displayed on the television screen such as 404a or on such an app 1005a, instructing the user relative to their location where they can move speakers for better sound quality.

Furthermore, based on the detected content being watch, there IoT system may use a further machine learning model to assign content recommendations to certain users. In particular, a prompt such as FIG. 7A may pop up on the television screen, or on the screen of a user phone 204 using an app such as 1005a connecting the phone 204 with the television 202, asking "Are you a new user?" If the user clicks yes under 705a using either the remote 206 or the phone 204 as input, then the television may guide the user through a registration process and start associating content watched with a particular user, as well as Wi-Fi signatures with a user. For example, many humans have different favorite poses or gestures that may be unique to them, such as lying down on a sofa such as sofa 214 shown in FIG. 2, or sitting upright, or picking their nose, or nervously biting their teeth, etc. The monitoring of the Wi-Fi signature by gathering input from the environment and user at step 909 may occur at regular intervals, and for a continuous predetermined period of time (e.g. anywhere between 1 second–10 minutes), and this process may occur even after the presence of one or more humans has been conducted in step 1001.

That is, at step 1017 through monitoring of Wi-Fi signature associated with registered users, additional aggregated metadata can be gathered with for an output class of people. Thus, a machine learning model, including a deep learning neural network model with back-propagation similar to step 915 may be able to be used. However in this model, the output layer would not simply be two nodes representing YES or NO with respect to detection of the presence of one or more humans, but would rather be node 1 representing Registered User 1, node B representing Registered User 2, etc., where there may be a plurality of registered users. By adding metadata of content watched as detected by the TV after step 1005, and monitoring for change in Wi-Fi signature that may be associated with physical user poses, the machine learning model may be able to associate certain TV shows as input with respective users.

Accordingly, for all users it may be able to provide content recommendations in line with what they typically have liked on their metadata. Furthermore, through association of poses through change in WiFi signature with certain registered users as input in the model, when a user is even detected to be sitting or making a unique pose on a sofa 414, this may enable the model to determine that a certain registered user is sitting on the sofa in front of the TV. In particular, the model is trained to adjust the weights of input nodes such that a change in input components into the machine learning model comprising the WiFi signature reflected by making such a pose enables the model to determine that a certain registered user is sitting on the sofa in front of the TV.

In addition to the inputs previously mentioned, variance of said inputs (e.g. variance over a predetermined period of time of transmission of Wi-Fi signal from speaker 210a, etc.) may also be used as an additional or alternative input in the input layer 602a of the machine learning model. Then, when the model determines a certain user has sat in front of the TV, the television 202 may turn on automatically the respective user's favorite show, or a show it thinks the user would like based on their aggregated metadata.

For example, often when a user may arrive home after a busy workday, he/she may not have the energy to turn on the TV. In this case the model can turn his/her favorite TV show on automatically. To make sure that the TV is collecting metadata for the correct user, it can ask from time to time, in a prompt similar to GUI 700a "Are you user X," where user X reflects the user the model determines may be sitting in front of the TV. The Yes / No 705a, 707a response by the user can further serve as training data for the model. In this manner, when minors are watching TV this can also be detected by such a machine learning model, and when such a determination is made, parental controls can be turned on automatically by the TV, such as 202, to prevent minors from watching content that may not be suitable for them.

The IoT system comprised of the apparatus modules 102 and the central TV module 104 further comprises a suite of environmental and safety features with regard to the reference set-up 200 shown in FIG. 2.

First, at step 1005, as previously discussed above, media being heard or watched is detected. In this case, if no media is being heard or watched, then the system may keep monitoring input at predetermined intervals from its constituent components as discussed above. After a predetermined amount of time, it can enter a green mode to turn the television off. Even in the case that it is being watched, an additional machine learning model can be used to identify changes in Wi-Fi signature, as discussed above, to particularly determine when a user may be sleeping even though media is playing. In this case, the system enters the green mode. In the green mode, the system may also control battery-powered devices such as the device remote 206, or any of the speakers 210 if they are battery powered (such as the subwoofer 210*f* which may need extra batteries to amplify wattage), to enter a low-power mode in order to conserve battery power.

Particular poses are identified with sleeping, in which case the IoT system transitions from YES at step 1005 to step 1009, in variance with the normal procedure described above, where the system would transition to steps 1011 and 1017. In this case, because the system is continuously gathering input and storing it in steps 909 and 911, periodically a detection for sleep may be run on this data. In particular, an input change in the Wi-Fi signature in three-dimensions, including ambient sound recorded as described above, may be unique for a change such as lying down, resting one's head on a pillow, or even leaning back on a sofa such as 214.

In addition, sounds such as snoring that are uniquely associated with sleeping may be within a certain frequency and discernable by the ambient sound recorded which is also an input into the model. Because it is difficult to ask a user when he/she is sleeping to generate metadata, pre-generated meta-data from user tests or experts. Then using these parameters, and the previous input as discussed into the input layer 602*a* of a machine learning model such as the neural network with back-propagation as shown in 6A, the output layer 606*a* would be representative of two nodes, 1 which would represent that the user is sleeping, and 2 which would represent where the user is not sleeping. If the value of 1 after the model had been propagated would be greater than 2, then it would be determined that the user is sleeping.

This is shown as well in step 1015. Although such monitoring for sleep through machine learning could also occur periodically (such as even after YES is determined at step 1005 as described above), step 1015 shows that it would also occur even after the television/media has been turned off. That is, in an embodiment, even after the television/media is turned off, input continues to be gathered in steps 909 and 911, on the basis of which monitoring for sleep continues to occur at step 1015.

When a user is detected as asleep in front of the TV, the IoT system may adjust accordingly in step 1023, by entering sleep mode. For example, as described above, it may control the movement of speakers and lights in such a manner as to dim lights (e.g. 412*a* and 412*b*) to play ambient music conducive to deep sleep to provide an adequate sleeping environment. The user can change any of these preferences by accessing an appropriate menu in the TV. Further, a user may be able to pre-set an alarm using an application of a type such as 1005*a* from his/her phone 404 in communication with the TV, or using an application stored in the memory of the TV 402 along with the remote 406. In particular the user may set a desired time using a numeric keypad 808, as shown in a detailed view of such a remote in FIG. 8, or by pressing keys on his/her cell phone 404, which can then output and received by the TV 402.

The TV can then perform an ambient sunrise as shown in 402*a* of FIG. 4. The sunrise may begin a predetermined amount of time before the user has requested to be awoken up, so as to be woken up gently. In particular, the TV screen of a TV central module 104 may display graphics (e.g. a Sun moving), executed by the GPU or by the processor of the TV described above. These graphics gradually become bright in the direction that the user is sleeping (wherein the user's position may be determine, e.g., as explained above). In addition, ambient sound can gradually get larger. Determination of if the user is still sleeping, as with the machine learning model in step 1015 can continuously be made. In case the user is still sleeping at the time he requested to be woken up, loud music can be played particularly in speakers proximate to the user's determined location, so as to wake the user up quickly. In this manner, a sleep mode and waking up routine in 1023 can be performed by the IoT system.

Finally, the IoT system is equipped with the safety feature of detecting an intruder. In step 1003, if at step 1001 the presence of a user is not detected in front of the TV, then a further machine learning model, as displayed in 6A or 6B may be run on gathered data to check if there is an apparent intruder outside of the zone of detection shown in FIG. 2. In an embodiment, such a machine learning model may continuously be monitored for a positive result (indicating there is an apparent intruder), even if the presence of a user is detected in 1001. In such an embodiment the detection of step 1003, as with step 1015, may occur at continuous predetermined intervals (e.g. anywhere between every 1 second-10 minutes).

In particular, unique changes in the Wi-Fi signature, defined by some or all of the inputs described above, may be associated with the presence of an intruder. For example, furtive fighting motions may have a particular Wi-Fi signature in three-dimensions or cause a unique change of inputs of the Wi-Fi signature over time. At first, the parameters for such a machine model may be hardcoded by experts identifying unique changes in Wi-Fi signature. For example, since the ambient sound picked up by at least one microphone as described above is an input in the input layer 602 of such a model, the sound of shattered glass indicating a door breaking may be programmed to be recognized as associated with a burglar. Similar sounds might include people screaming, gunshots being fired, etc. The output layer 606*a* of such a machine learning model includes two nodes, where node 1 may represent an intruder being present, and node 2 may represent no intruder being present.

As described above, if the value of node 1 after propagation is less than node 2, then the output from the model may be that there is not an apparent intruder (NO at step 1003). In this case, the same steps as described above with the green mode (1009 to 1015 to 1023) may be followed by the system.

Alternatively, however, if the value of node 1 is greater than node 2, then the model may output an apparent intruder present (YES at step 1003). In this case, the location of the intruder is determined. If sounds and movement are determined to be coming from outside the room in which the sensors are located (or outside, e.g., the high resolution detection zone 212), then GUI 700*b* may be displayed on the TV screen (in case there is a registered user at home) and simultaneously sent to a registered user's phone, using an application such as 1005*a* described above connecting the phone such as 204 with the TV 202.

When the phone 204 is carried away from the detection zone of the TV 202, such a message can be sent from the TV 202 wireless network interface 1224, over the internet, and to the phone 204. The message can be programmed to flash on the user's phone screen, wherein the user must either choose an option 705*b* to sound an alarm at the house, or an option 707*b* to ignore the warning. Meanwhile, the TV module (e.g. 202) may automatically turn on a play content to make a potential intruder believe there are guests inside the house, as a deterrent. Alternatively, if sounds and movement are determined to be coming inside the room in which the sensors located (e.g. inside the high resolution detection zone 212), then because the IoT model has detected an inside intruder, the message is only sent to a registered user's phone as described.

Then, after a predetermined period of time after the GUI has been displayed, if a user response has been determined, corresponding action can be taken. In the case of ignore 707*b*, under step 1019, no action is taken. In the case of sound alarm 705*b*, under step 1019 very loud sounds are played on the TV, and the speakers can be programmed to record any events occurring in the vicinity of the setup. In case there has been no response from the user, by default the TV may play loud sounds or activate a decoy mode as described above to make a potential intruder believe there are guests inside the house, under step 1021. The user can choose which of the two options under step 1021 he prefers through a menu of the TV module 202, or one of the two options can be chosen at random. Based on the type of response received from the user ate step 1013, or no response received, in which case an intruder is marked as present by default, metadata is collected and a data point is stored in the central module repository 104*a*. In this manner, data collected from multiple users may be shared across computing resources 1105, and the nodes and weights of such a model can be better trained.

Embodiments describing further use of the WiFi remote 206 for energy-efficient system operation, and for boosting presence detection capabilities of the system as a whole, will herein be described. It is not always the case that speakers may be present in the system, or that the user will necessarily be present in the detection zone 1312 created by such speakers.

Figure 13:
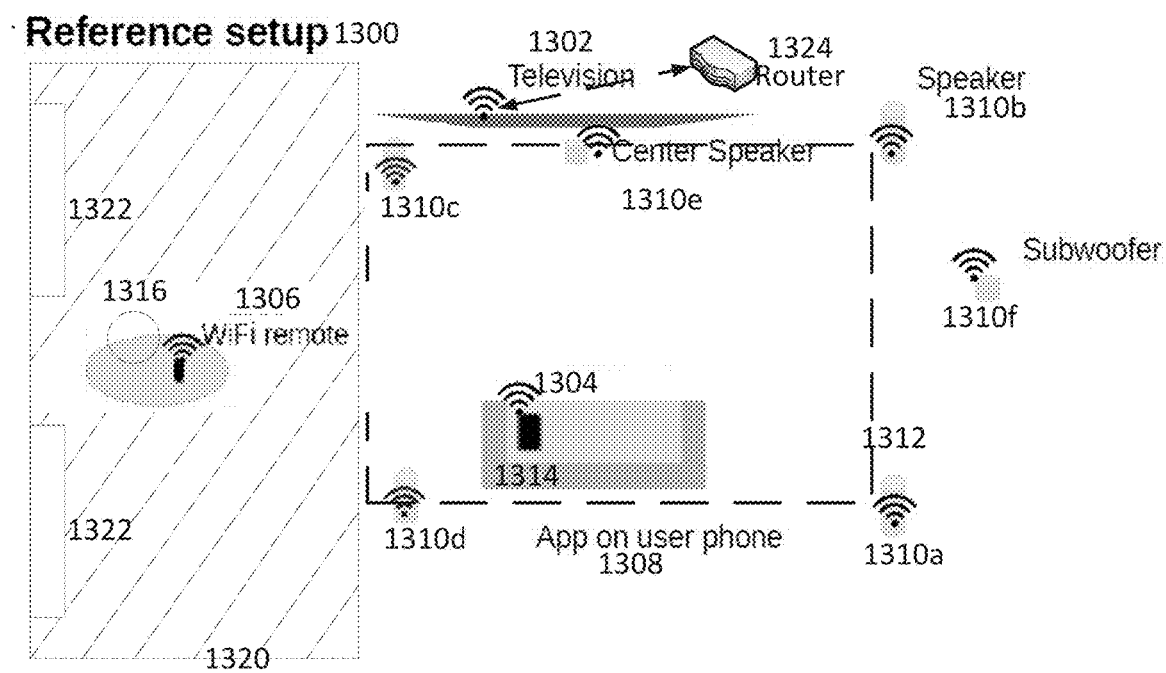
FIG. 13 is a reference setup of a plurality of where a device WiFi remote may be used in conjunction with interactive sensors/devices to form a zone around a potential user space, in front of a television, according to some embodiments.

FIG. 13 shows a reference setup 1300 analogous to reference setup 200 of FIG. 2, but wherein a user 1316 may be present in a zone 1320 depicted by shaded lines that is entirely outside of the high-resolution detection zone. For example, a user 1316 may be sitting at a coffee or dining table with a WiFi remote 1306. In this case, the user may be in a cold zone, wherein the system may keep track of zones within a predetermined geographical region 1318. The system, in central data repository 104*a*, may have a composite map of regions as described above, wherein in such map there are hot zones that are well-triangulated for detection with multiple sensors, such as the detection zone 1312 created by the presence of the speakers 1310*a*-1310*f*, wherein regions falling outside of these zones in the map are designated cold zones.

In a further embodiment, the speakers 1310*a*-1310*f* may not even be present at all. In either embodiment, the user 1316 is in an area that is a cold zone and not well-triangulated. In this case, the user may still have the WiFi remote device 1306. For example, the user may be having a meal or a drink, and would like to switch channels and watch the television 1302 from his or her location in the cold zone 1320.

Due to its proximity to the user when the television is turned on based on its most frequent uses (to change channels, browse menus on the television screen, etc.), the device remote 1306 provides a very high quality link for detecting the presence of a user. There are several ways in which the remote 1306 can work in unison with the television 1302 and other speakers 1310 (if they are present) to determine the presence/absence of a user as well as the geographic location of the user in the predetermined geographic zone 1318.

One way in which the absence or presence of a user may be immediately evident is through user-based manipulation and activity of holding and pushing buttons on the remote 206. As described above with respect to remote 206, Boolean logic may be used, to account for the movement and handling of remote 1306. For example, an embodiment of the remote 1306 is shown in FIG. 8, with multiple buttons 806-807 and an IR transmitter where the numeral 802 is located. A baseline score may be present with regard to a composite measurement of movement of the remote detected by the accelerometer 812, gyroscope 814, key presses over a substantial period of time etc. The score can also include detection of IR transmission activity from the transmitter 802 over a period of time by the television 202. Then, when the composite score is above a threshold compared to the baseline score, one or more humans may be deemed to be present. Further, if the remote 1306 of the reference setup 1300 is detected by the gyroscope 814 as tilted to an almost vertical angle when the remote cannot normally lie vertically in a resting position, and the accelerometer 812 detects accelerating movement wherein keys 808 are also detected as pressed over an extended period of time, it would be determined that a human is using the remote in front of the TV, and this would be reflected in the measured score compared to the baseline score.

Geographic location may be determined by WiFi signals transmitted from the remote's WiFi radio 810. In an embodiment, through a request displayed on the television or through a mobile application on the user phone 1304, the user may be asked to walk around the cold zone 1320. In the embodiment above where the speakers are not present, this cold zone 1320 may comprise the entirety of the area of 1318 in front of the television 1302 and router 1324. The router 1324 may comprise an additional apparatus module 102 in communication with the television 1302, where apparatus modules 102 have been detailed above.

Without the presence of the remote 1306, the detection of human presence may be only from the WiFi radio of the television 1302, which communicates with the router 1324. This mode of detection may be rather limited. In particular, if the user is located directly between the television 1302 and the router 1324, which is a small segment of FIG. 13 as indicated by the dashed bidirectional line between the two components, then the television may be able to detect the presence of the user with a higher degree of accuracy. In this case, because the user is present directly in the transmission path from the WiFi transmitter of the television and the WiFi receiver of the router 1324, the presence of the sure would result in a significant drop in signal such that detection with a reasonable degree of certainty could occur. Because the antenna of television 1302 and router 1324, respectively, is omnidirectional, there are additional transmission paths in all directions, where for instance the signal may be reflected off of the walls of geographic zone 1318 and received by the router 1324, and vice versa. However, because of loss of signal upon reflection, increased distance to the router, etc., any blockage in these additional paths may result in a lower impact in the overall signal received by the router (a drop in signal may be small and not able to be easily detected with certainty).

For example, in the case as shown in FIG. 13, the user 1316 is located substantially far away from the transmission path between the television 1302 and the router 1324. There may be a transmission path wherein WiFi signal transmitted from the router 1324 may reflect off of windows 1322 and return to the television 1302, wherein the presence of a user 1316 may result in the blockage of this path and a subsequent drop in the overall WiFi signal received by the television 1302. However, because of the signal loss due to reflection upon encountering the windows, and the increased distance from the router 1324 to windows 1322 and then from the windows 1322 to the television 1302, this transmission path may not contribute significantly enough to the overall signal received by the router 1324 for the overall signal received by the television 1302 to be dropped enough that the presence of a user 1316 can be accurately detected. Other factors such as general noise in reception, etc., may also contribute to small recurrent drops in overall signal received by the television 1302, where it may be difficult to determine with certainty whether the drop in signal has indeed been caused by the presence of a user.

It is in this type of case that it is tremendously useful to utilize the remote 1306 for the use of human presence detection. Because when a television 1302 is operated by the user 1316 the user typically utilizes the remote for operation of the television, the remote 1306 will typically be located near the user 1316. As a result, it is more likely that the user will be present to a greater degree in collectively all of the transmission paths from the omnidirectional antenna of the WiFi transmitter module 810 of the remote 1306 and the WiFi receiver modules in television 1302 as well as router 1324. In addition, when the user may be prompted to walk around the room as described above with respect to geographical region 1318 to better map cold zones, the infrared module 802 or the WiFi transmitter module 810 may be used to map other blockages in sending of the signal. For example, the user may be prompted to move the remote 1306 up and down at various points in cold zones such as 1320 to monitor blockages in the Z or vertical direction of a standard XYZ coordinate system. In this manner, blockages such as furniture, lamp poles, tables, and other fixtures that may be present throughout the room may be accounted for. In particular, three-dimensional coordinates of hot and cold zones, as well as locations where potential fixtures may be present, can be mapped in this manner to the composite map. The infrared module 802 of the remote may be particularly useful wherein furniture is present between the remote 1306 and a reflective surface that the remote is pointing towards. For example, in FIG. 13, if the remote was moved up and down in its location, and a coffee table is present between the remote and the upper window 1322 shown in cold zone 1320, then it would be accurately detected by the infrared module. On the other hand, when furniture is present between the WiFi remote and the television, such as speaker 1310c, with no reflective surfaces in the transmission path, this may be detected well by the WiFi module 810. In this manner, interpolation of the infrared module and WiFi module readings can be used in any combination to detect for potential furniture present in the geographical region of 1318, and these potential locations and 3D coordinates of such blockages can be added to the hot and cold zones (also in three dimensions) to the composite map of the central repository 104a, where the data of the hot and cold zones may indicate how weak signal transmission is relative to a baseline from respective locations in the composite map, including all potential blockage locations.

As a result of the locations of blockages already being present in the composite map, because of the accelerometer and gyroscope 812 and 814 located on the remote 1306, it has the positioning capability, together with WiFi signal triangulation (occurring as described above) from the router 1324 and television 1302, to locate where the remote is present with respect to the composite map. Such WiFi signal triangulation may be used in conjunction with triangulation data from the speakers as described above for a more accurate representation, or can be used alone if no speakers 1310 are present. Therefore, if the remote is in a location where furniture may be located in the transmission paths from the remote 1306 to the television 1302 or the router 1324 such that it may result in a substantial drop of signal, the signal to be sent from the remote 1306 at that location can be boosted beforehand by the CPU of the central module 104, such that the signal can overcome the drop in reception due to the furniture, and can still be used to detect the presence of a user that may be present in such a location. In particular, there is a roughly linear correspondence between the transmission level of the WiFi radio 810 of the remote 1306, and a respective reception level of the WiFi radio of the television 1302 or the router 1324. Therefore, where a mapped furniture may be blocking the transmission path of the WiFi remote 1306 to the television 1302 or router 1324, and the drop in signal reception relative to a baseline is known, the transmitted signal from the remote 1306 may be increased by the same proportion as the drop in signal reception to overcome the drop in reception caused by the presence of the blockage.

This sort of calibration helps the system to adapt in a uniform manner to different levels of transmission blockages caused by the arrangement of fixtures in a room. In particular, because the relative strength of a user's phone 1308 may vary, and because the signal strength of transmission of the WiFi may not be able to be controlled by an app on the user's phone 1308, it is useful to conduct such a mapping, and subsequent signal manipulation by the WiFi remote 1306. As detailed above, in this case the CPU of the television 1302 can send to a transmitting apparatus module (here the WiFi module 810 of the remote 1306) instructions to force-send a boosted signal, wherein the software not only pushes data but also controls its transmission through the network interface layer, and can help expedite sending of such a boosted signal from its virtual transmitter as shown in FIG. 3.

In addition to the zonal and object mapping features of the remote described above, the remote may also offer energy-saving features as it has two-tiered mode of operation, in a low-power mode, or a full-power mode in conjunction with the low-power (sleep) or regular modes of operation of the television 1302. These modes of operation will herein be described, wherein the presence detection feature is maintained in full capacity even while these devices may be operating in reduced power modes. Such energy-efficient modes of operation may be particularly useful in the case where the remote is battery-powered, directly resulting in less expenditure on batteries for consumers. In addition, these modes result in the television and remote together consuming less power, which can also lead to less mains power consumed, resulting in savings for a user over the long run. By default, unless the presence of a user is potentially detected, the remote 1306 may remain in a low-power mode in order to conserve battery power.

Figure 14:
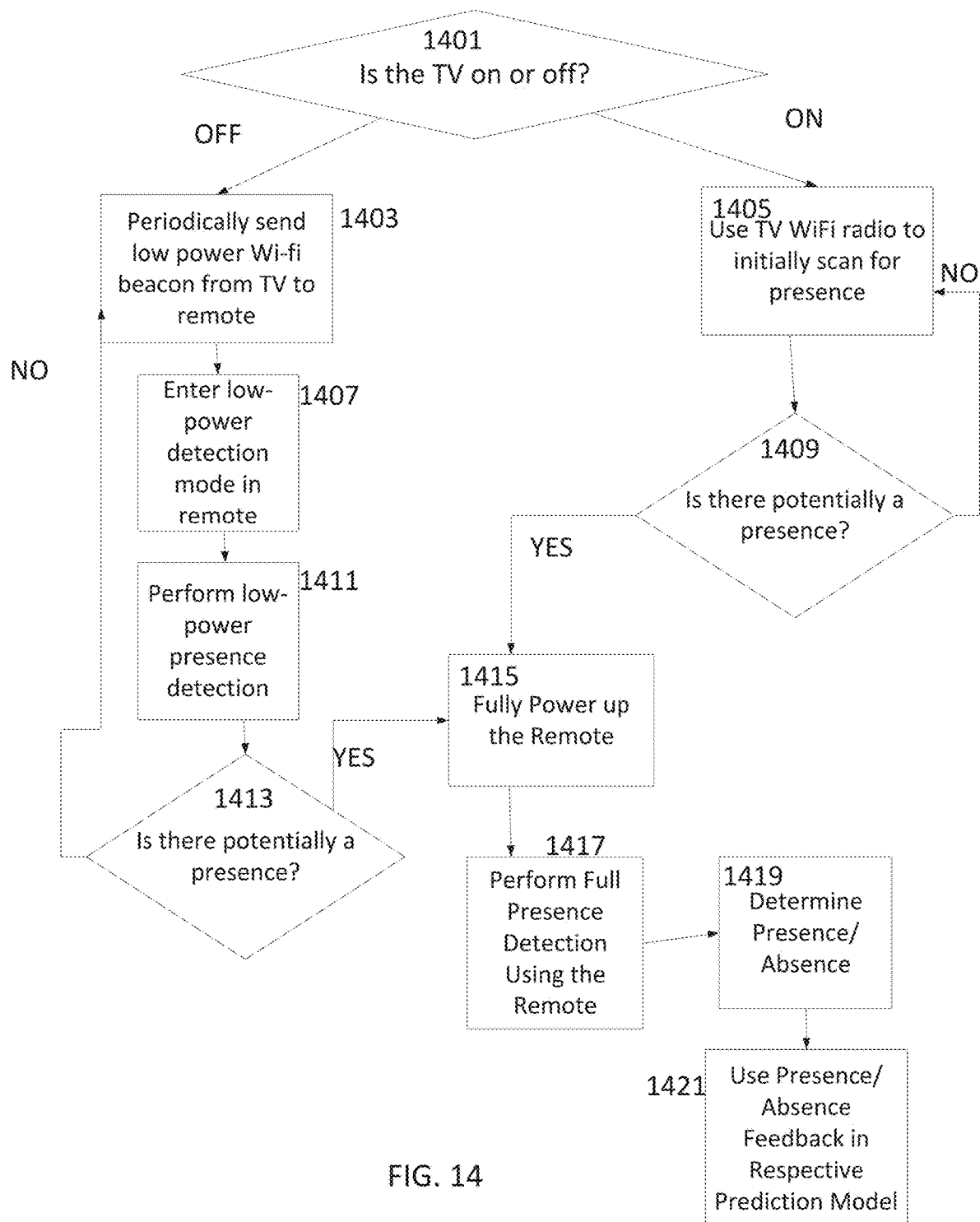
FIG. 14 is a flowchart illustrating actions that are taken by the device remote based on the television being turned on or off to detect the presence or absence of a user in front of the television, according to some embodiments.

Example energy-efficient modes of operation are shown in FIG. 14. In an embodiment, the mode in which energy-efficient operation of the remote is conducted may depend on whether the television (TV) 1302 is on or off (as shown in step 1401). Alternately, the same mode can also always be followed regardless of whether the TV is on or off.

As shown in FIG. 14, at step 1401 it is determined whether the TV is on or off. Such a determination may occur through the CPU 1204 of television 1302, where standard operating systems may support a number of system power states, etc., and the status of whether the television 1302 is on or not may be stored in a CPU variable, where the CPU may not fully power off although the TV is turned off. Alternately, such a determination may also occur through the pressing of buttons or handling of a remote as described above, by detecting sound transmitted from the TV 1302 to any speakers 1310 (if present), etc.

Then, in step 1405, if the TV 1302 is determined to be on (ON as shown in FIG. 14), the WiFi radio transmitter present in the TV 1302 may be used to initially scan for the potential presence of a user. This may be useful to do when the TV is already turned on as determined in step 1401, since because the TV is fully powered on, it may not cost any additional energy to use the TV WiFi radio, whereas when the TV is turned off, it may take additional energy to first power the TV on in a different system power state to be able to use the WiFi radio of the TV.

The WiFi radio of the TV 1302 as discussed above, may not be as accurate used alone to definitely state whether a user is present or not as the resulting drop in signal may also be due to noise, etc., but it can still be used as a potential indicator for presence. Thus data readings are first scanned from the WiFi signal transmitter present in the TV 1302. Since the TV is turned on, the network layer of the WiFi module can be used to force-send a strong signal, for a potentially higher RSSI which is beneficial as described above. The signal received by the router 1324, and vice versa from the router 1324 to the TV 1302, may be gathered as raw data by the CPU.

The raw data, gathered in step 1405, may in turn, may be fed to a neural network machine learning classifier of the type of FIG. 6A described above. Such a machine learning classifier may then be used, in step 1409, to determine the absence or presence of a user in front of the TV within the geographical range of 1318. The CPU may feed the RSSI signal strength received by the router, the strength of WiFi signal transmitted from the TV 1302, and a baseline value based on the composite map or historical or other user data for the RSSI strength of a signal received by a router at approximately the same strength the signal is transmitted by the WiFi module of the TV in a standard room of approximately the same size to the classifier. In particular, any combination of these three values may be used as values of input layer nodes in input layer 602a of the machine learning classifier of step 1409. After comparing output layer node values as discussed above, the outcome of step 1409 may be determined by the CPU, indicating whether there is a potential presence of a user or not. Such a model may be trained over time. The results of a more accurate detection, which occur in step 1419 as detailed below, may be used to compute error and conduct backpropagation as described above, in the machine learning classifier model of step 1409. Thus over time, the model may become more accurate to a degree in determining the potential presence of a user.

After step 1409, if it is determined that a user is not potentially present (NO at step 1409), then the process simply goes back to step 1405 and continues to potentially scan for presence at periodic intervals. On the other hand, if it is determined that a user is potentially present (YES at step 1409), then the remote 1306 may be fully powered up at step 1415. The remote is fully powered up in order to perform a full presence detection in step 1417.

In this step 1417, the remote 1306 determines potential presence in a more robust and stronger detection mode. At the very minimum, for the reasons discussed above, it is likely that the remote 1306 is proximate to the user 1316 and for that reason provides a high quality link in determining true presence/absence of a user. As discussed above, the drop in a WiFi signal transmitted from the remote 1306 to the TV 1302 or the router 1324 will be more substantial if the user is (as is likely the case) proximate to the remote. Furthermore, because there are at least 3 WiFi access points that can all transmit and receive signals (the remote 1306, the TV 1302, and the router 1324), triangulation of WiFi signals can occur. Such triangulation enables a greater accuracy not only of presence detection, but also of determining a position in the room as described above. Such a determined position of a drop in signal may also be cross-verified with the composite map to make sure a drop in signal is not a false positive when there is already a pre-existing furniture or other blockage at that position in the room.

Such a check with the composite map may involve, e.g., calculating the signal strength transmitted by the remote 1306 subtracted by the RSSI signal strength received for either the TV 1302 or the router 1324, further subtracted by any signal drop due to pre-existing furniture in the same location present in the composite map. If the result is a substantial amount (not close to zero), then the process may continue to step 1419. If the result is approximately close to zero (within 0.5 dBm or any other such predetermined interval), then step 1419 is skipped and the outcome is determined as absent.

Upon cross-checking with the composite map, the raw data gathered from the presence detection step 1417 may be inputted into a neural network machine learning classifier of the type shown in FIG. 6A. The raw data may be inputted in the form of signal strength transmitted, RSSI signal strength received by the TV 1302, RSSI signal strength received by the router 1324, RSSI signal strength received by speaker(s) 1310a-1310f (if they are present), and any pre-existing drop in signal strength due to nearby pre-existing furniture from the composite map. As described above, the data may then be forward-propagated through the model, and an outcome of presence or absence can be determined. As further discussed above with reference to the classifier of FIG. 6A, actual results can be used (knowledge of presence/absence of a user or affirmation by a user e.g. through the GUI in FIG. 7A) to calculate error and backpropagate through the model, making the model more robust over time. This is reflected in step 1421 of the process. That is, in step 1421, the model's outputs in step 1419 of presence or absence may also be fed as the correct result into the separate neural network machine learning classifier of step 1409 (or of step 1413 as will be discussed below), for calculation of error and backpropagation in that machine learning classifier. Because of different inputs, different degrees of accuracy, different WiFi radios used for transmission, etc., it is necessary to use different neural network machine learning classifiers at steps 1409 (and analogously step 1413 as will be discussed) and step 1419.

The energy-efficient process when the TV 1302 is determined to be off at step 1401 is now discussed. In this case, if the TV is determined as off (OFF at step 1401), then although the TV is turned off, the CPU may still be active. In this reduced power state, the CPU can send a low power WiFi beacon to the remote 1306.

This is shown in step 1403 of FIG. 14. Once such a low power WiFi beacon reaches the remote 1306, then the remote may enter a low-powered detection mode in step 1407. In essence, because as described above the signal strength in the network layer of the WiFi module 810 of the remote 1306 can be controlled, a signal transmitted in a low-powered detection mode may be limited to some percentage threshold value (e.g. less than or equal to 40% of normal signal transmission power). Then, once the remote 1306 has entered the low-powered detection mode, which may be an intermediate power state between the low-power mode and the full-power mode of the remote 1306, a low-power presence detection may be performed by the remote in step 1411.

The low-power presence detection mode is analogous to the full-presence detection mode discussed in step 1417 above. However, as discussed above, in the low-power detection mode, the signal transmitted by the remote 1306 is at a lower power threshold. As a result, the result of such a detection, while not conclusively accurate, may be accurate to a degree for detecting a potential presence in step 1413, as with step 1409. In particular, raw data is first gathered by the TV 1302 or the router 1324 at a low-power transmitted signal from the WiFi transmitter of 1306 at step 1411. Then this raw data may be fed to the neural network machine learning classifier at step 1413 in the same manner as raw data is fed for 1417. In this low-power mode, as with the classifier of step 1417, triangulation may be used in conjunction with the TV 1302 and the router 1324 as described above to improve accuracy of results in detecting a potential presence while still operating at low power.

In an alternate embodiment, if the classifier is found to produce satisfactory results even without triangulation, the neural network machine learning classifier of 1413 can also be used without triangulation present in the model of step 1417. Accordingly, a comparison with a composite map or input of readings from the composite map into the neural network machine learning classifier of 1413 may not occur for the embodiment without triangulation. The nodes of the output layer of the machine learning classifier of 1413 are interpreted as described above with respect to FIG. 6A for determining the presence or absence of a user in front of the TV 1302 in the geographical region of 1318.

If the outcome of the machine learning classifier at step 1413 indicates that there is a user potentially present, then as with step 1409 described above, the process proceeds to steps 1415 through 1421. If the outcome of the machine learning classifier at step 1413 indicates that there is not a user potentially present, then the process returns to step 1403, wherein the CPU operates to make the television 1302 continue to send low power WiFi beacons from the TV to the remote at periodic intervals for low-power presence detection at step 1411.

An embodiment of error correction for the neural network machine learning classifiers of step 1413 is further described. In particular, because the power is limited to below a certain threshold, a loss function (for calculation of error, as described with respect to the neural network machine learning classifier of FIG. 6A above) of the neural network machine learning classifier may be set as a modified weighted cross-entropy loss function. This function may be represented in mathematical form as:

$$-\frac{1}{M}\sum_{m=1}^{M}[w_{mcfn} * y_m * \log(h_\theta(x_m)) + w_{mcfp} * (1 - y_m) * \log(1 - h_\theta(x_m))].$$

In this equation, M may represent a number of training examples at different levels of power transmission (e.g. one for every percent from 1-40%, where a 40% threshold of full power as discussed above may be used), $w_{mcfn}$ may represent a marginal cost of a false negative over a true positive (absence when there is presence), and $w_{mcfp}$ may represent the marginal cost of a false positive over a true negative (presence when there is absence), $y_m$ may represent the label of presence of a user, and $1-y_m$ may represent absence of a user, $x_m$ may represent input nodes of a training example m and $h_\theta$ may represent the model with weights θ. Because the situation of absence when there is presence is to be avoided at all costs (the remote should be at full power when a present user wants to use it), the marginal cost of a false negative over a true positive may be weighted higher than the marginal cost of a false positive over a true negative. Even if a false positive occurs, at the later full presence detection stage it is likely that an absence will be accurately detected, so little harm occurs.

Furthermore, for progressively higher samples m with higher levels of power transmission, both the above-mentioned marginal costs may be weighted higher, because since more progressively more energy is used, more battery power is lost. Thus, using the above modified equation as a loss function in error calculation, and then using the results to backpropagate through the machine learning classifier of step 1413 may result in an optimized classifier with a high degree of low-power presence detection (although lower in accuracy than the classifier of 1417) while consuming a low amount of power.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   executing, by at least one processor, a collection routine at regular intervals to gather raw data including at least signal strength of wireless transmission from a plurality of sensors for a continuous predetermined period of time, each of the plurality of sensors comprising a transmitter, wherein the executing the collection routine comprises varying, by the at least one processor, a respective signal strength and a respective time of one or more of a plurality of transmitters;
   receiving, by the at least one processor, results of the collection routine in a form of the raw data from the plurality of sensors;
   storing, by the at least one processor, the received results in a central data repository; generating, by the at least one processor, a three-dimensional composite map of signal strength based on the stored results;
   analyzing, by the at least one processor, the stored results to determine whether any media is being consumed;
   analyzing, by the at least one processor, the three-dimensional composite map of signal strength to determine if there are one or more humans present proximate to the at least one processor within a predetermined geographical range;
   in response to determining that there are one or more humans present proximate to the at least one processor within the predetermined geographical range, determining, by the at least one processor, particular poses associated with sleeping of the one or more humans based on the three-dimensional composite map and the raw data from the plurality of sensors, and
   in response to determining that there are one or more humans present and no media is being consumed, executing, by the at least one processor, at least one further action.

2. The method of claim 1, wherein the plurality of sensors are in geographic proximity to the at least one processor.

3. The method of claim 1, wherein the plurality of sensors form a high-resolution detection zone in front of the at least one processor, in 2 or 3 dimensions in a shape configurable by placement of the plurality of sensors.

4. The method of claim 1, wherein the analyzing the three-dimensional composite map of signal strength to determine if one or more humans are proximate to the at least one processor within the predetermined geographical range comprises:
   feeding, by the at least one processor, the raw data as input to a neural network machine learning classifier, the neural network machine learning classifier having an input layer that receives the raw data as a plurality of inputs, and an output layer; and
   comparing, by the at least one processor, values of nodes in the output layer to determine a presence or absence of one or more humans proximate to the at least one processor within the predetermined geographical range.

5. The method of claim 1, further comprising:
   executing, by the at least one processor, the collection routine at the regular intervals to continue to gather the raw data from the plurality of sensors;
   storing, by the at least one processor, the gathered raw data in the central data repository; and
   monitoring and analyzing, by the at least one processor, the three-dimensional composite map of signal strength to determine whether an intruder is present.

6. The method of claim 5, wherein, in response to determining that the intruder is present, the executing the at least one further action comprises:
   executing, by the at least one processor, commands to generate a graphic user interface (GUI);
   displaying, on the GUI by the at least one processor, a warning to an owner-user, warning the owner-user of the intruder; and
   executing, by the at least one processor, an alarm action after a predetermined time of receiving no input from the owner-user, after the warning is displayed.

7. The method of claim 1, wherein the executing the at least one further action comprises:
   determining, by the at least one processor and based on the three-dimensional composite map of signal strength, a respective geographic position of the one or more humans that are determined to be present;
   determining, by the at least one processor, whether the one or more humans that are determined to be present are asleep based on the particular poses associated with sleeping of the one or more humans based on the three-dimensional composite map and the raw data from the plurality of sensors; and
   in response to determining that the one or more humans are asleep, executing, by the at least one processor, commands to control one or more of a visual display on a television screen, lighting with respect to brightness and angle relative to the one or more humans, and sound emanating from a plurality of speakers, to perform an ambient sunrise relative to the respective geographic position of the one or more humans that are determined to be present.

8. A system, comprising:
   a memory; and
   at least one processor coupled to the memory and configured to:
   execute a collection routine at regular intervals to gather raw data including at least signal strength of wireless transmission from a plurality of sensors for a continuous predetermined period of time, each of the plurality of sensors comprising a transmitter, wherein to execute the collection routine, the at least one processor is configured to vary a respective signal strength and a respective time of one or more of a plurality of transmitters;
   receive results of the collection routine in a form of the raw data from the plurality of sensors;
   store the received results in a central data repository in the memory;
   generate a three-dimensional composite map of signal strength based on the stored results;
   analyze the stored results to determine whether any media is being consumed;
   analyze the three-dimensional composite map of signal strength to determine if there are one or more humans present proximate to the at least one processor within a predetermined geographical range;

in response to a determination that there are one or more humans present proximate to the at least one processor within a predetermined geographical range, to determine particular poses associated with sleeping of the one or more humans based on the three-dimensional composite map and the raw data from the plurality of sensors, and in response to a determination that there are one or more humans present and no media is being consumed, execute at least one further action.

9. The system of claim 8, wherein the plurality of sensors are in geographic proximity to the at least one processor.

10. The system of claim 8, wherein the plurality of sensors form a high- resolution detection zone in front of the at least one processor, in 2 or 3 dimensions in a shape configurable by placement of the plurality of sensors.

11. The system of claim 8, wherein to analyze the three-dimensional composite map of signal strength to determine if one or more humans are proximate to the at least one processor within the predetermined geographical range, the at least one processor is further configured to:

provide the raw data as input to a neural network machine learning classifier, the neural network machine learning classifier having an input layer that is configured to receive the raw data as a plurality of inputs, and an output layer; and compare values of nodes in the output layer to determine a presence or absence of one or more humans proximate to the at least one processor within the predetermined geographical range.

12. The system of claim 8, wherein [to execute at least one further action,] the at least one processor is further configured to:

execute the collection routine at the regular intervals to continue to gather the raw data from the plurality of sensors;

store the gathered raw data in the central data repository; and monitor and analyze the three-dimensional composite map of signal strength to determine whether an intruder is present.

13. The system of claim 12, wherein, in response to a determination that the intruder is present, to execute at least one further action, the at least one processor is further configured to:

generate a graphic user interface (GUI);

display, on the GUI, a warning to an owner-user, warning the owner-user of the intruder; and execute an alarm action after a predetermined time of receiving no input from the owner-user, after the warning is displayed.

14. The system of claim 8, wherein to execute the at least one further action, the at least one processor is further configured to:

determine, based on the three-dimensional composite map of signal strength, a respective geographic position of the one or more humans that are determined to be present;

determine whether the one or more humans that are determined to be present are asleep based on the particular poses associated with sleeping of the one or more humans based on the three-dimensional composite map and the raw data from the plurality of sensors; and in response to a determination that the one or more humans are asleep, execute commands to control one or more of a visual display on a television screen, lighting with respect to brightness and angle relative to the one or more humans, and sound emanating from a plurality of speakers, to perform an ambient sunrise relative to the respective geographic position of the one or more humans that are determined to be present.

15. A non-transitory computer-readable medium having instructions stored thereon that, when executed by at least one computing device, cause the at least one computing device to perform operations comprising:

executing a collection routine at regular intervals to gather raw data including at least signal strength of wireless transmission from a plurality of sensors for a continuous predetermined period of time, each of the plurality of sensors comprising a transmitter, wherein the executing the collection routine comprises varying a respective signal strength and a respective time of one or more of a plurality transmitters;

receiving results of the collection routine in a form of the raw data from the plurality of sensors;

storing the received results in a central data repository;

generating a three-dimensional composite map of signal strength based on the stored results;

analyzing the stored results to determine whether any media is being consumed;

analyzing the three-dimensional composite map of signal strength to determine if there are one or more humans present proximate to the at least one computing device within a predetermined geographical range;

in response to determining that there are one or more humans present proximate to the at least one processor within a predetermined geographical range, determining, by the at least one processor, particular poses associated with sleeping of the one or more humans based on the three-dimensional composite map and the raw data from the plurality of sensors, and in response to determining that there are one or more humans present and no media is being consumed, executing at least one further action.

16. The non-transitory computer-readable medium of claim 15, wherein the plurality of sensors form a high-resolution detection zone in front of the at least one computing device, in 2 or 3 dimensions in a shape configurable by placement of the plurality of sensors.

17. The non-transitory computer-readable medium of claim 15, wherein the analyzing the three-dimensional composite map of signal strength to determine if one or more humans are proximate to the at least one computing device within the predetermined geographical range comprises:

feeding the raw data as input to a neural network machine learning classifier, the neural network machine learning classifier having an input layer that receives the raw data as a plurality of inputs, and an output layer; and comparing values of nodes in the output layer to determine a presence or absence of one or more humans proximate to the at least one computing device within the predetermined geographical range.

18. The non-transitory computer-readable medium of claim 15, the operations further comprising:

executing, by the at least one processor, the collection routine at the regular intervals to continue to gather the raw data from the plurality of sensors;

storing the gathered raw data in the central data repository; and monitoring and analyzing the three-dimensional composite map of signal strength to determine whether an intruder is present.

19. The non-transitory computer-readable medium of claim 18, wherein, in response to determining that the intruder is present, the executing the at least one further action comprises:
    executing commands to generate a graphic user interface (GUI);
    displaying, on the GUI, a warning to an owner-user, warning the owner-user of the intruder; and executing an alarm action after a predetermined time of receiving no input from the owner-user, after the warning is displayed.

20. The non-transitory computer-readable medium of claim 15, wherein the executing the at least one further action comprises:
    determining, based on the three-dimensional composite map of signal strength, a respective geographic position of the one or more humans that are determined to be present;
    determining whether the one or more humans that are determined to be present are asleep based on the particular poses associated with sleeping of the one or more humans based on the three-dimensional composite map and the raw data from the plurality of sensors;
    in response to determining that the one or more humans are asleep, executing commands to control at least one or more of a visual display on a television screen, lighting with respect to brightness and angle relative to the one or more humans, and sound emanating from a plurality of speakers, to perform an ambient sunrise relative to the respective geographic position of the one or more humans that are determined to be present.

\* \* \* \* \*